US012743134B2

(12) United States Patent
Ahn

(10) Patent No.: US 12,743,134 B2
(45) Date of Patent: Sep. 22, 2026

(54) ELECTRONIC DEVICE COMPRISING WATERPROOF STRUCTURE

(71) Applicant: Samsung Electronics Co., Ltd., Suwon-si (KR)

(72) Inventor: Wooin Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 18/409,700

(22) Filed: Jan. 10, 2024

(65) Prior Publication Data

US 2024/0143037 A1 May 2, 2024

Related U.S. Application Data

(63) Continuation of application No. PCT/KR2022/008130, filed on Jun. 9, 2022.

(30) Foreign Application Priority Data

Jul. 15, 2021 (KR) ........................ 10-2021-0092632

(51) Int. Cl.
*G06F 1/16* (2006.01)

(52) U.S. Cl.
CPC .................................. *G06F 1/1656* (2013.01)

(58) Field of Classification Search
CPC ..... G06F 1/1626; G06F 1/1656; G06F 1/1688
See application file for complete search history.

(56) References Cited

U.S. PATENT DOCUMENTS

| | | | |
|---|---|---|---|
| 8,431,204 B2 | 4/2013 | Ueki et al. | |
| 8,986,802 B2 * | 3/2015 | Karube .................. | H04R 31/00 428/40.1 |
| 9,578,402 B2 | 2/2017 | Mori | |
| 9,639,123 B2 | 5/2017 | Choi et al. | |
| 9,668,301 B2 | 5/2017 | Lim et al. | |
| 10,171,896 B2 | 1/2019 | Seo et al. | |

(Continued)

FOREIGN PATENT DOCUMENTS

| | | |
|---|---|---|
| CN | 206908851 | 1/2018 |
| EP | 3668109 | 6/2020 |

(Continued)

*Primary Examiner* — Anthony Q Edwards
(74) *Attorney, Agent, or Firm* — Nixon & Vanderhye, P.C.

(57) ABSTRACT

Disclosed is an electronic device including: a side member comprising a bezel at least partially surrounding a space between a front surface and a rear surface of the electronic device, a speaker hole extending through at least a portion of the side member, a module case disposed in an interior of the space and surrounding a speaker module comprising a speaker configured to emit sound through the speaker hole, and a waterproof structure disposed between the side member and the module case, wherein the waterproof structure may include a waterproof tape member comprising a waterproof tape, a porous member comprising a porous material having a plurality of openings, the openings having sizes smaller than a size of the speaker hole, and a waterproof bond member comprising a waterproof bonding material extending through the plurality of openings and coupled to the waterproof tape member and the porous member while overlapping with the waterproof tape member and the porous member.

20 Claims, 21 Drawing Sheets

(56) References Cited

U.S. PATENT DOCUMENTS

| | | | | |
|---|---|---|---|---|
| 10,258,934 | B2 | 4/2019 | Mori et al. | |
| 10,897,660 | B1 * | 1/2021 | Xiang | G06F 1/1688 |
| 11,134,323 | B2 * | 9/2021 | Mietta | H04R 1/025 |
| 11,281,255 | B2 | 3/2022 | Kim et al. | |
| 2009/0245565 | A1 * | 10/2009 | Mittleman | H04R 1/025 381/189 |
| 2011/0117304 | A1 * | 5/2011 | Ueki | H04R 1/023 156/247 |
| 2014/0167365 | A1 * | 6/2014 | Chu | F16J 15/062 277/590 |
| 2015/0373439 | A1 | 12/2015 | Mori | |
| 2016/0037243 | A1 * | 2/2016 | Lippert | H04R 1/023 381/166 |
| 2017/0127163 | A1 * | 5/2017 | Weber | G10K 11/004 |
| 2017/0135239 | A1 * | 5/2017 | Hyun | G06F 1/1656 |
| 2017/0157573 | A1 | 6/2017 | Mori et al. | |
| 2018/0132020 | A1 * | 5/2018 | Seo | H04M 1/03 |
| 2020/0348725 | A1 | 11/2020 | Kim et al. | |
| 2023/0269514 | A1 * | 8/2023 | Cousins | H04R 1/1025 381/74 |
| 2025/0380077 | A1 * | 12/2025 | Tyson | H04R 1/1075 |

FOREIGN PATENT DOCUMENTS

| | | |
|---|---|---|
| JP | 2009-194744 | 8/2009 |
| JP | 2013-254909 | 12/2013 |
| JP | 2016-021502 | 2/2016 |
| JP | 3225412 | 3/2020 |
| KR | 10-2011-0030582 | 3/2011 |
| KR | 10-2014-0018840 | 2/2014 |
| KR | 10-1570845 | 11/2015 |
| KR | 10-1593983 | 2/2016 |
| KR | 10-1812784 | 12/2017 |
| KR | 10-2018-0052291 | 5/2018 |
| KR | 10-2018-0092188 | 8/2018 |
| KR | 10-2020-0037772 | 4/2020 |
| KR | 10-2020-0126570 | 11/2020 |
| KR | 10-2198792 | 1/2021 |
| KR | 10-2022-0107818 | 8/2022 |

* cited by examiner 400
420
430
410
502
501
420
430
410

700
720
707
730
SP2
430
420
410
G2
G1
710
SP1
410
420
430
400

1410 } 1400
1431, 1530, 1630 } 1430 } 1400

ELECTRONIC DEVICE COMPRISING WATERPROOF STRUCTURE

CROSS-REFERENCE TO RELATED APPLICATIONS

This application is a continuation of International Application No. PCT/KR2022/008130 designating the United States, filed on Jun. 9, 2022, in the Korean Intellectual Property Receiving Office and claiming priority to Korean Patent Application No. 10-2021-0092632, filed on Jul. 15, 2021, in the Korean Intellectual Property Office, the disclosures of each of which are incorporated by reference herein in their entireties.

BACKGROUND

Field

The disclosure relates to an electronic device including a waterproof structure, and a method for forming the same.

Description of Related Art

An electronic device may display an image through a display disposed in a housing. A plurality of pixels for displaying an image may be disposed in the display. The plurality of pixels may receive data voltages and light emission signals for displaying an image from a display driver IC (DDI).

The electronic device may require dustproof and waterproof structures for ensuring a smooth operation and preventing and/or reducing foreign substances from being introduced into an interior thereof according to a use environment. For example, an electronic device, such as a mobile communication terminal, an electronic notebook, or a tablet PC, which is used while the user carries it may be usually exposed to various operation environments. In spite of changes in the operation environments, the electronic device may be provided with various forms of dustproof and waterproof structures to ensure a stable operation performance by preventing and/or reducing contaminations due to introduction of foreign substances or the like.

The electronic device may block moisture and foreign substances through a waterproof structure disposed therein. However, due to degradation of an assembling performance of the one or more components included in the electronic device, it may not suitable for mass production.

SUMMARY

Embodiments of the disclosure provide an electronic device that may optimize a mounting space, decrease shear stresses, and minimize/reduce a water penetration path, and a method for forming the same.

An electronic device according to an example embodiment of the disclosure may include: a side member comprising a bezel at least partially surrounding a space between a front surface and a rear surface of the electronic device, a speaker hole formed through at least a portion of the side member, a module case disposed in an interior of the space and surrounding a speaker module comprising a speaker configured to emit sound through the speaker hole, and a waterproof structure disposed between the side member and the module case, wherein the waterproof structure may include a waterproof tape member comprising waterproof tape, a porous member comprising a material configured to pass sound and having a plurality of openings, sizes of the openings being smaller than that of the speaker hole, and a waterproof bond member comprising a waterproof material introduced through the plurality of openings and coupled to the waterproof tape member and the porous member while overlapping with the waterproof tape member and the porous member.

An electronic device according to an example embodiment of the disclosure may include: a first mechanical structure comprising a surface facing an outside of the electronic device, a second mechanical structure comprising a surface spaced apart from the first mechanical structure, a through-hole formed through at least a portion of the first mechanical structure, and a waterproof structure disposed between the first mechanical structure and the second mechanical structure, and the waterproof structure may include a porous member comprising a material configured to pass sound connected to the through-hole and having a plurality of openings, sizes of the openings being smaller than an opening of the through-hole, and a waterproof bond member comprising a waterproof material introduced into the plurality of openings and coupled to the first mechanical structure and the porous member while overlapping with the first mechanical structure and the porous member.

The electronic device according to various example embodiments disclosed in the disclosure may optimize a mounting space and reduce manufacturing costs.

The electronic device according to various example embodiments disclosed in the disclosure may minimize and/or reduce shear stresses.

The electronic device according to various example embodiments disclosed in the disclosure may minimize and/or reduce a water penetration path.

The electronic device according to various example embodiments disclosed in the disclosure may be configured such that at least three electronic parts may be bonded to each other through the water bond member while overlapping each other.

The electronic device according to various example embodiments disclosed in the disclosure may simplify a machining process as a process for removing a machining step is unnecessary.

In addition, various effects that are directly or indirectly recognized through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In a description of the drawings, the same or similar components may be denoted by the same or similar reference numerals.

DETAILED DESCRIPTION

Hereinafter, various example embodiments of the disclosure will be described in greater detail with reference to the accompanying drawings. However, it should be understood that the disclosure is not limited to specific embodiments and includes various modifications, equivalents, and/or alternatives of the embodiments of the disclosure.

Figure 1:
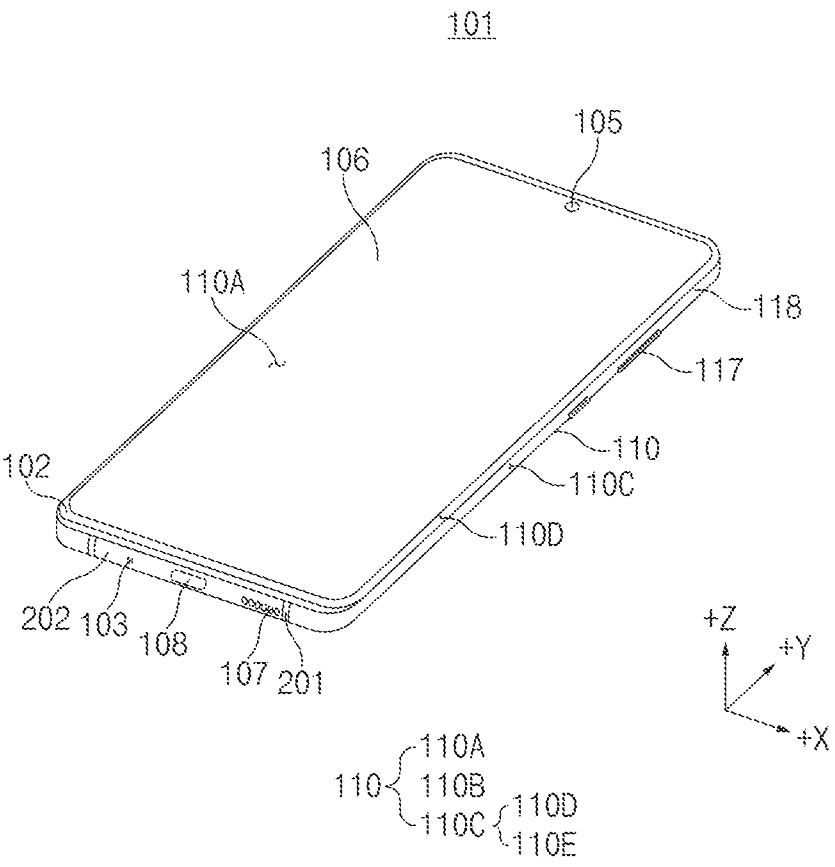
FIG. 1 is a front perspective view illustrating a front surface of an electronic device according to various embodiments.
Figure 2:
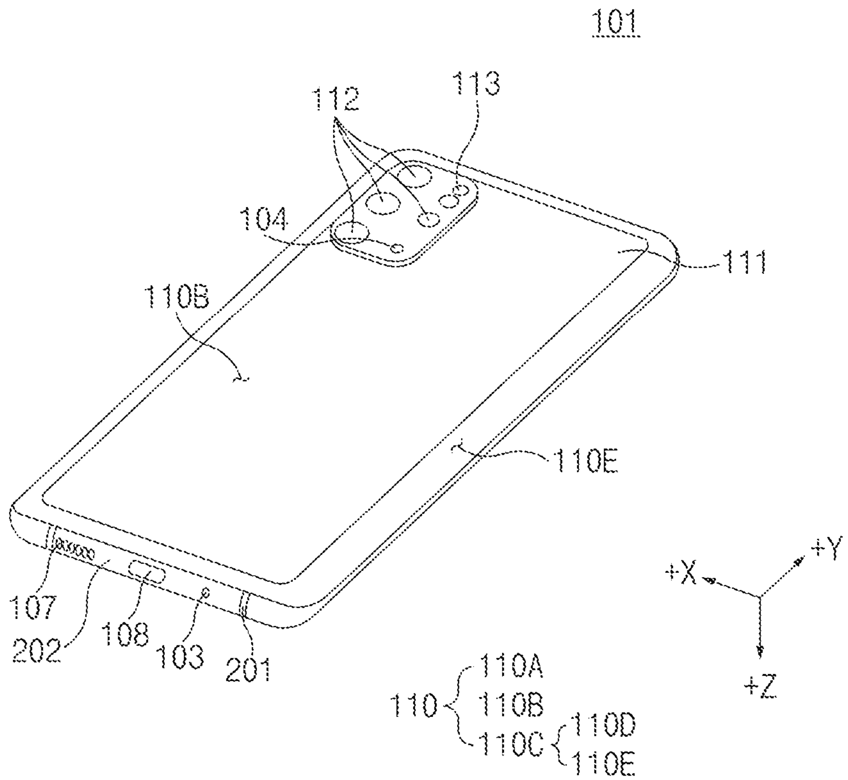
FIG. 2 is a rear perspective view illustrating a rear surface of an electronic device according to various embodiments.

FIG. 1 is a front perspective view of an electronic device according to various embodiments, and FIG. 2 is a rear perspective view of an electronic device according to various embodiments.

Referring to FIGS. 1 and 2, an electronic device 101 may include a housing 110 including a first surface (or a front surface) 110A, a second surface (or a rear surface) 110B, and side surfaces 110C that surround a space between the first surface 110A and the second surface 110B.

In an embodiment (not illustrated), the housing 110 may refer to a structure that defines some of the first surface 110A, the second surface 110B, and the side surfaces 110C.

In an embodiment, the first surface 110A may be defined by a front plate 102 (e.g., a glass plate including various layers or a polymer plate), at least a portion of which is substantially transparent. The second surface 110B may be defined by a substantially opaque rear plate 111. The rear plate 111, for example, may be formed by coated or colored glass, ceramic, a polymer, a metal (e.g., aluminum, stainless steel (STS), or magnesium), or a combination of at least two of the materials. The side surfaces 110C may be coupled to the front plate 102 and the rear plate 111, and may be defined by side bezel structures (or "a frame structure or a side member") 118 including a metal and/or a polymer.

In an embodiment, the rear plate 111 and the side bezel structures 118 may be integrally formed, and may include the same material (e.g., a metallic material such as aluminum).

In the illustrated embodiment, the front plate 102 may include two first areas 110D that are deflected from a partial area of the first surface 110A toward the rear plate 111 and extend seamlessly. The first areas 110D may be located at opposite ends of a long edge of the front plate 102.

In the illustrated embodiment, the rear plate 111 may include two second areas 110E that are deflected from a partial area of the second surface 110B toward the front plate 102 and extend seamlessly. The second areas 110E may be located at opposite ends of a long edge of the rear plate 111.

In an embodiment, the front plate 102 (or the rear plate 111) may include only one of the first areas 110D (or the second areas 110E). Furthermore, in an embodiment, the front plate 102 (or the rear plate 111) may not include some of the first areas 110D (or the second areas 110E).

In an embodiment, when viewed from a lateral side of the electronic device 101, the side bezel structure 118 may have a first thickness (or a width) in a side direction (e.g., a short side), in which neither the first area 110D nor the second area 110E is included, and may have a second thickness that is smaller than the first thickness in a side direction (e.g., a long side), in which the first areas 110D or the second areas 110E are included.

In an embodiment, the electronic device 101 may include at least one of a display 106, audio modules 103 and 107, a sensor module (not illustrated), camera modules 105, 112, and 113, a key input device 117 (e.g., an input module 550 of FIG. 5), a light emitting element (not illustrated), and a connector hole 108. In an embodiment, the electronic device 101 may exclude at least one (e.g., the key input device 117 or the light emitting element (not illustrated)) of the components, or may further include another component.

In an embodiment, the display 106 may be visible through a corresponding portion of the front plate 102. For example, at least a portion of the display 106 may be visible through the front plate 102 including the first surface 110A, and the first areas 110D of the side surfaces 110C.

In an embodiment, a corner of the display 106 may have a shape that is substantially the same as an adjacent outer shape of the front plate 102. In an embodiment (not illustrated), to expand the visible area of the display 106, an interval between an outskirt of the display 106 and an outskirt of the front plate 102 may be formed to be substantially the same.

In an embodiment, a surface (or the front plate 102) of the housing 110 may include a screen display area that is formed as the display 106 is visible. For example, the screen display area may include the first surface 110A and the first areas 110D of the side surface.

In an embodiment (not illustrated), the screen display areas 110A and 110D may include a sensor area (not illustrated) that is configured to acquire biometric information of a user. Here, "the screen display areas 110A and 110D include the sensing area" may be understood that at least a portion of the sensing area may overlap the screen display areas 110A and 110D. For example, the sensor area (not illustrated) may refer, for example, to an area that may display visual information through the display 106 like the other areas of the screen display areas 110A and 110D and may additionally acquire biometric information (e.g., a fingerprint) of the user.

In an embodiment, the screen display areas 110A and 110D of the display 106 may include an area, through which the first camera module 105 (e.g., a punch hole camera) may be visually exposed. For example, at least a portion of a periphery of an area, in which the first camera module 105 is exposed, may be surrounded by the screen display areas 110A and 110D. In an embodiment, the first camera module 105 may include a plurality of camera modules.

In an embodiment (not illustrated), the display 106 may be coupled to or disposed to be adjacent to a touch detecting circuit, a pressure sensor that may measure an intensity (pressure) of a touch, and/or a digitizer that detects a stylus pen in a magnetic field scheme.

In an embodiment, the audio modules 103, 104, and 107 may include the microphone holes 103 and 104, and the speaker hole 107.

In an embodiment, the microphone holes 103 and 104 may include the first microphone hole 103 that is formed in a partial area of the side surface 110C and the second microphone hole 104 that is formed in a partial area of the second surface 110B. Microphones for acquiring external sound may be disposed in interiors of the microphone holes 103 and 104. The microphones may include a plurality of microphones to detect a direction of sound. In an embodiment, the second microphone hole 104 formed in a partial area of the second surface 110B may be disposed to be adjacent to the camera modules 105, 112, and 113. For example, the second microphone hole 104 may acquire sound when the camera modules 105, 112, and 113 are executed, or may acquire sound when another function is executed.

In an embodiment, the speaker hole 107 may include the external speaker hole 107 and a communication receiver hole (not illustrated). The external speaker hole 107 may be formed at a portion of the side surface 110C of the electronic device 101. In an embodiment, the external speaker hole 107 may be implemented by the microphone hole 103 in one hole. Although not illustrated, the communication receive hole (not illustrated) may be formed at another portion of the side surface 110C. For example, the communication receiver hole (not illustrated) may be formed at another portion (e.g., a portion that faces the +Y axis direction) of the side surface 110C, which faces a portion (e.g., a portion that faces the −Y axis direction) of the side surface 110C, at which the external speaker hole 107 is formed.

In an embodiment, the electronic device 101 may include a speaker that is communicated with the speaker hole 107. In an embodiment, the speaker may include a piezo speaker, in which the speaker hole 107 is omitted.

In an embodiment, the sensor module (not illustrated) may generate electrical signals or data values corresponding to an operation state of the interior of the electronic device 101 or an external environmental state. For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illumination sensor.

In an embodiment, the camera modules 105, 112, and 113 may include the first camera module 105 (e.g., the punch hole camera) that is exposed through the first surface 110A of the electronic device 101, the second camera module 112 that is exposed through the second surface 110B, and/or the flash 113.

In an embodiment, the first camera module 105 may be exposed through a portion of the screen display areas 110A and 110D of the display 106. For example, the first camera module 105 may be exposed through a partial area of the screen display areas 110A and 110D through an opening (not illustrated) formed at a portion of the display 106.

In an embodiment, the second camera module 112 may include a plurality of camera modules (e.g., a dual camera, a triple camera, or a quad camera). However, the second camera module 112 is not necessary limited to including the plurality of camera modules, and may include one camera module.

The first camera module 105 and the second camera module 112 may include one or a plurality of lenses, an image sensor, and/or an image signal processor. The flash 113, for example, may include a light emitting diode or a xenon lamp. In an embodiment, two or more lenses (an infrared ray camera lens, a wide angle lens, and a telescopic lens), and image sensors may be disposed on one surface of the electronic device 101.

In an embodiment, the key input device 117 may be disposed on the side surfaces 110C (e.g., the first areas 110D and/or the second areas 110E) of the housing 110. In an embodiment, the electronic device 101 may not include some or all of the key input devices 117, and the key input device 117 that is not included may be implemented in another form, such as a soft key. In an embodiment, the key input device may include a sensor module (not illustrated) that defines a sensing area (not illustrated) included in the screen display areas 110A and 110D.

In an embodiment, the connector hole 108 may accommodate a connector. The connector hole 108 may be disposed on the side surface 110C of the housing 110. For example, the connector hole 108 may be disposed on the side surface 110C to be adjacent to at least some of the audio modules (e.g., the microphone hole 103 and the speaker hole 107). In an embodiment, the electronic device 101 may include the first connector hole 108 that may accommodate a connector (e.g., a USB connector) for transmitting and receiving electric power and/or data to and from an external device, and/or a second connector hole (not illustrated) that may accommodate a connector (e.g., an earphone jack) for transmitting and receiving an audio signal to and from an external device.

In an embodiment, the electronic device 101 may include a light emitting element (not illustrated). For example, the light emitting element (not illustrated) may be disposed on the first surface 110A of the housing 110. The light emitting element (not illustrated) may provide state information of the electronic device 101 in a form of light. In an embodiment, the light emitting element (not illustrated) may provide a light source that interworks with an operation of the first camera module 105. For example, the light emitting element (not illustrated) may include an LED, an IR LED, and/or a xenon lamp.

In an embodiment, at least a portion of the side bezel structure 118 may function as an antenna that is electrically connected to a communication module. In an embodiment, the side bezel structure 118 may include a conductive part 202 that is formed of a metallic material, and a division part 201 that is formed of a nonmetallic material (e.g., a polymer). According to an embodiment, at least a portion of the conductive part 202 may be a radiator, for example, an antenna that is electrically connected to the communication module and radiates an RF signal output from the communication module.

Figure 3:
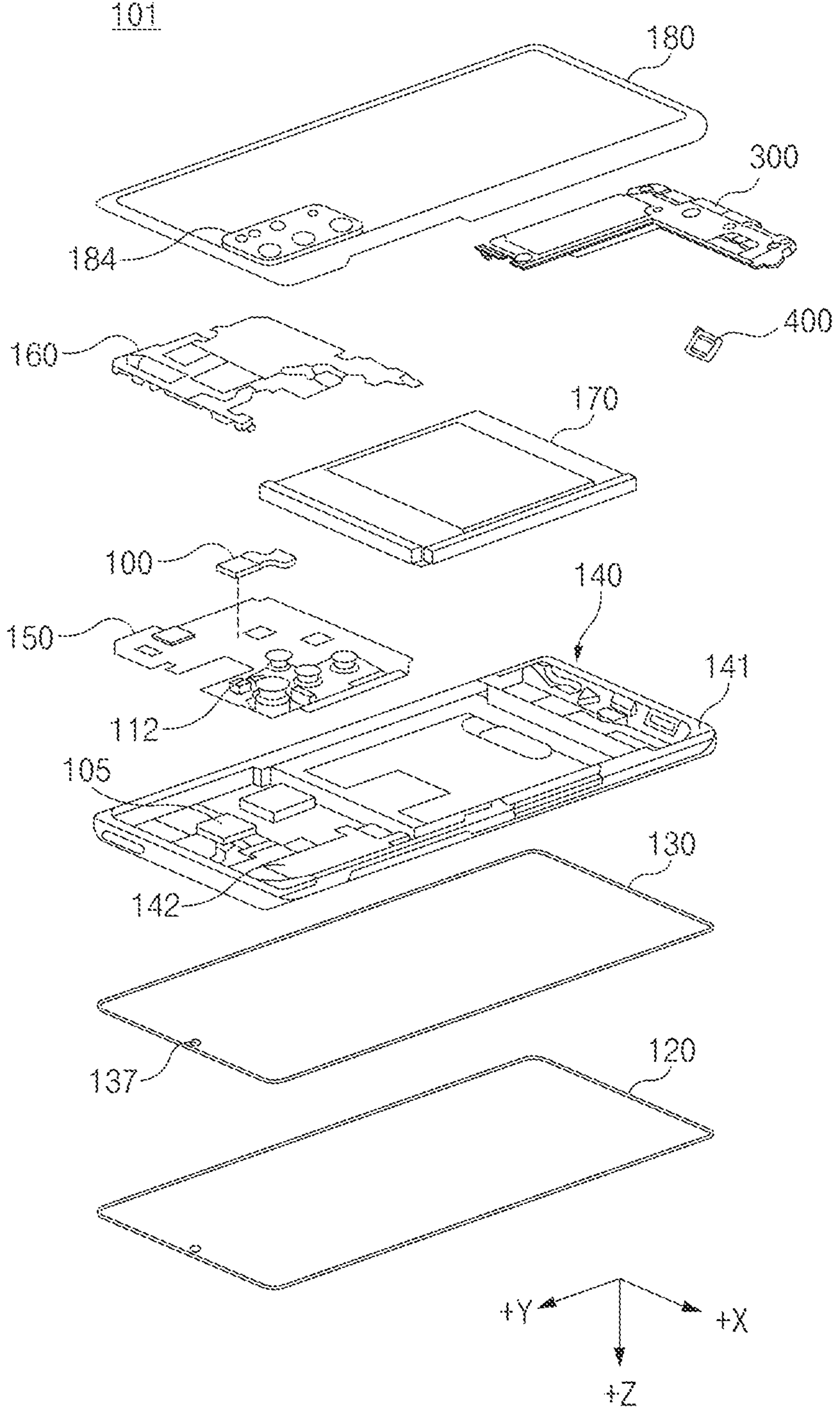
FIG. 3 is an exploded perspective view illustrating an electronic device according to various embodiments.

FIG. 3 is an exploded perspective view of the electronic device according to various embodiments.

Referring to FIG. 3, the electronic device 101 may include a front plate 120 (e.g., the front plate 102 of FIG. 1), a display 130 (e.g., the display 106 of FIG. 1), a bracket 140, a battery 170, a PCB 150, an RFPCB 100, a support member 160 (e.g., a rear case), and a rear plate 180 (e.g., the rear plate 111 of FIG. 2).

In an embodiment, the electronic device 101 may exclude at least one (e.g., the support member 160) from the components or may additionally include another component. At least one of the components of the electronic device 101 may be the same as or similar to at least one of the components of the electronic device 101 of FIGS. 1 and 2, and a repeated description thereof will be omitted hereinafter.

In an embodiment, at least some of the front plate 120, the rear plate 180, and the bracket 140 (e.g., a frame structure 141) may define the housing (e.g., the housing 110 of FIGS. 1 and 2).

In an embodiment, the bracket 140 may include the frame structure (or "the side member") 141 that defines a surface (e.g., a portion of the side surface 110C of FIG. 1) of the electronic device 101, and a plate structure 142 that extends from the frame structure 141 to an inside of the electronic device 101.

The plate structure 142 may be located in the interior of the electronic device 101, may be connected to the frame structure 141, or may be integrally formed with the frame structure 141. The plate structure 142, for example, may be formed of a metallic material and/or a nonmetallic material (e.g., a polymer). The display 130 may be coupled to one surface of the plate structure 142, and the PCB 150 may be coupled to a rear surface thereof. A processor, a memory, and/or an interface may be mounted on the PCB 150. The processor, for example, may include one or more of a central processing device, an application processor, a graphic processing device, an image single processor, a sensor hub processor, or a communication processor.

The memory, for example, may include a volatile memory or a nonvolatile memory.

The interface, for example, may include a high definition multimedia interface (HDMI), a universal serial bus (USB), an interface, an SD card interface, and/or an audio interface. The interface, for example may electrically or physically connect the electronic device 101 to an external device, and may include a USB connector, an SD card/MMC connector, or an audio connector.

In an embodiment, the battery 170 may supply electric power to at least one of the components of the electronic device 101. For example, the battery 170 may include a primary battery that cannot be recharged, a secondary battery that may be recharged, or a fuel cell. In an embodiment, at least a portion of the battery 170 may be disposed on substantially the same plane as the PCB 150. In an embodiment, the battery 170 may be integrally disposed in the interior of the electronic device 101 or may be disposed to be attached to or detached from the electronic device 101.

In an embodiment, the first camera module 105 may be disposed in the plate structure 142 of the bracket 140 such that the lens is exposed through a partial area of the front plate 120 (e.g., the front surface 110A of FIG. 1) of the electronic device 101.

In an embodiment, the first camera module 105 may be disposed such that an optical axis of the lens is at least partially aligned with a hole or a recess 137 formed in the display 130. For example, the area, through which the lens is exposed, may be formed in the front plate 120. For example, the first camera module 105 may include a punch hole camera, at least a portion of which is disposed in an interior of the hole or the recess 137 formed on a rear surface of the display 130.

In an embodiment, the second camera module 112 may be disposed in the PCB 150 such that the lens is exposed through a camera area 184 of the rear plate 180 (e.g., the rear surface 110B of FIG. 2).

In an embodiment, the camera area 184 may be formed on a surface (e.g., the rear surface 110B of FIG. 2) of the rear plate 180. In an embodiment, the camera area 184 may be formed to be at least partially transparent such that external light is input to the lens of the second camera module 112. In an embodiment, at least a portion of the camera area 184 may protrude from the surface of the rear plate 180 by a specific height. However, the disclosure is not necessarily limited thereto, and the camera area 184 may define substantially the same plane as the surface of the rear plate 180.

According to an embodiment, the electronic device 101 may include a speaker module 300 that is disposed in an interior space thereof. A sound signal emitted from the speaker module 300 may be discharged to an outside of the electronic device 101 through a path for delivering sound, which is provided in the interior space of the electronic device 101. For example, the speaker module 300 may be disposed in a space between the support member 160 and the rear plate 180. As another example, the speaker module 300 may be disposed in a space between the support member 160 and the front plate 120.

According to an embodiment, the electronic device 101 may include a waterproof structure 400 that is disposed in the interior space to be adjacent to the speaker module 300. The waterproof structure 400 may prevent and/or reduce moisture or foreign substances introduced from the speaker hole (e.g., the speaker hole 107 of FIGS. 1 and 2) (or the through-hole) from being introduced into the interior of the electronic device 101. The waterproof structure 400 may discharge the sound signal generated by the speaker module 300 to an outside through the speaker hole. The waterproof structure 400 may be disposed between at least any one of the side member 141, the front plate 120, and the support member 160 and the speaker module 300.

The electronic device 101 according to various embodiments may include an electronic device, such as, for example, and without limitation, a bar type, a foldable type, a rollable type, a sliding type, a wearable type, a tablet PC, a notebook PC, or the like. The electronic device 101 according to various embodiments of the disclosure is not limited to the above-described examples, and may include other various electronic devices.

Figure 4:
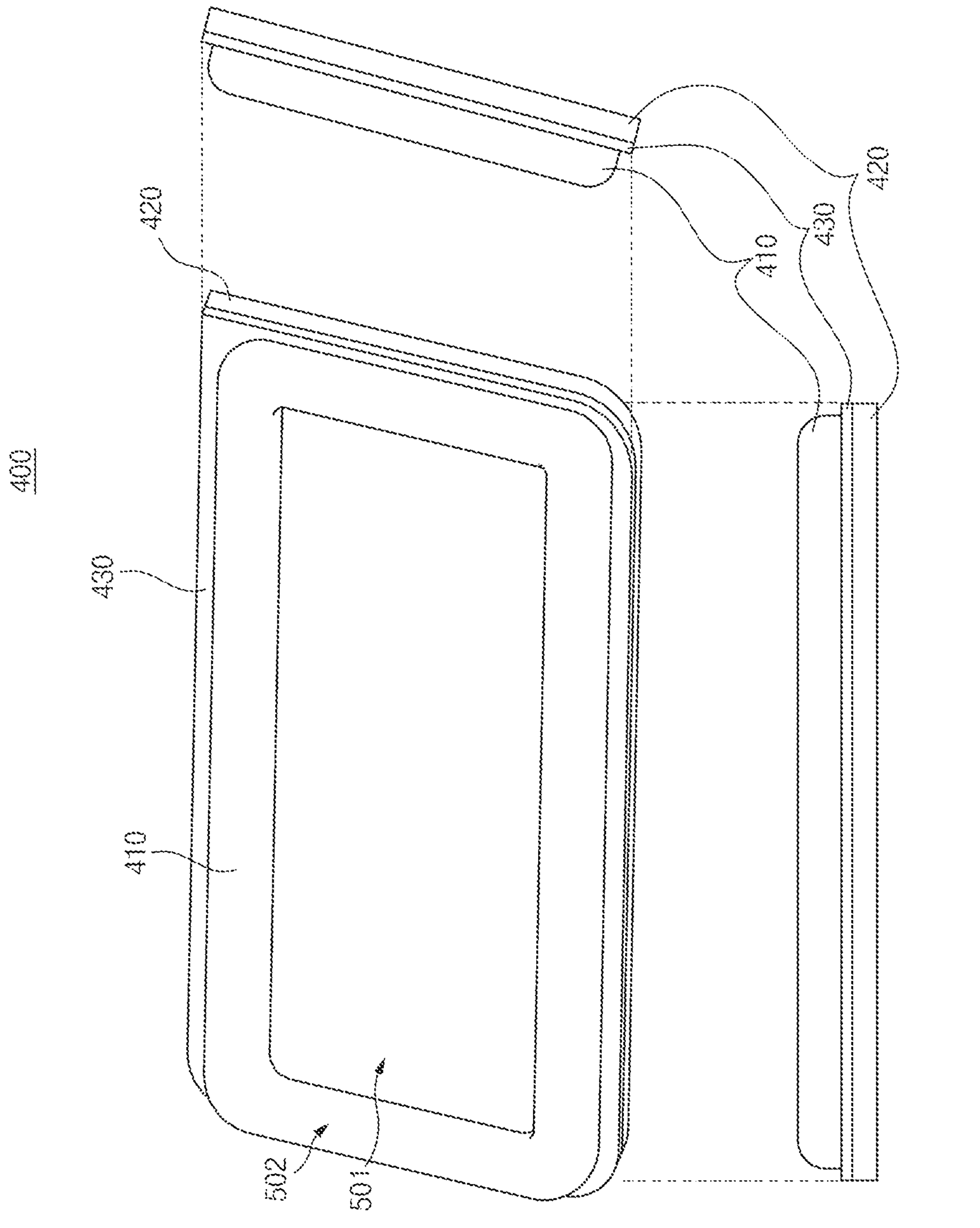
FIG. 4 is a perspective view illustrating an example waterproof structure included in an electronic device according to various embodiments.
Figure 5:
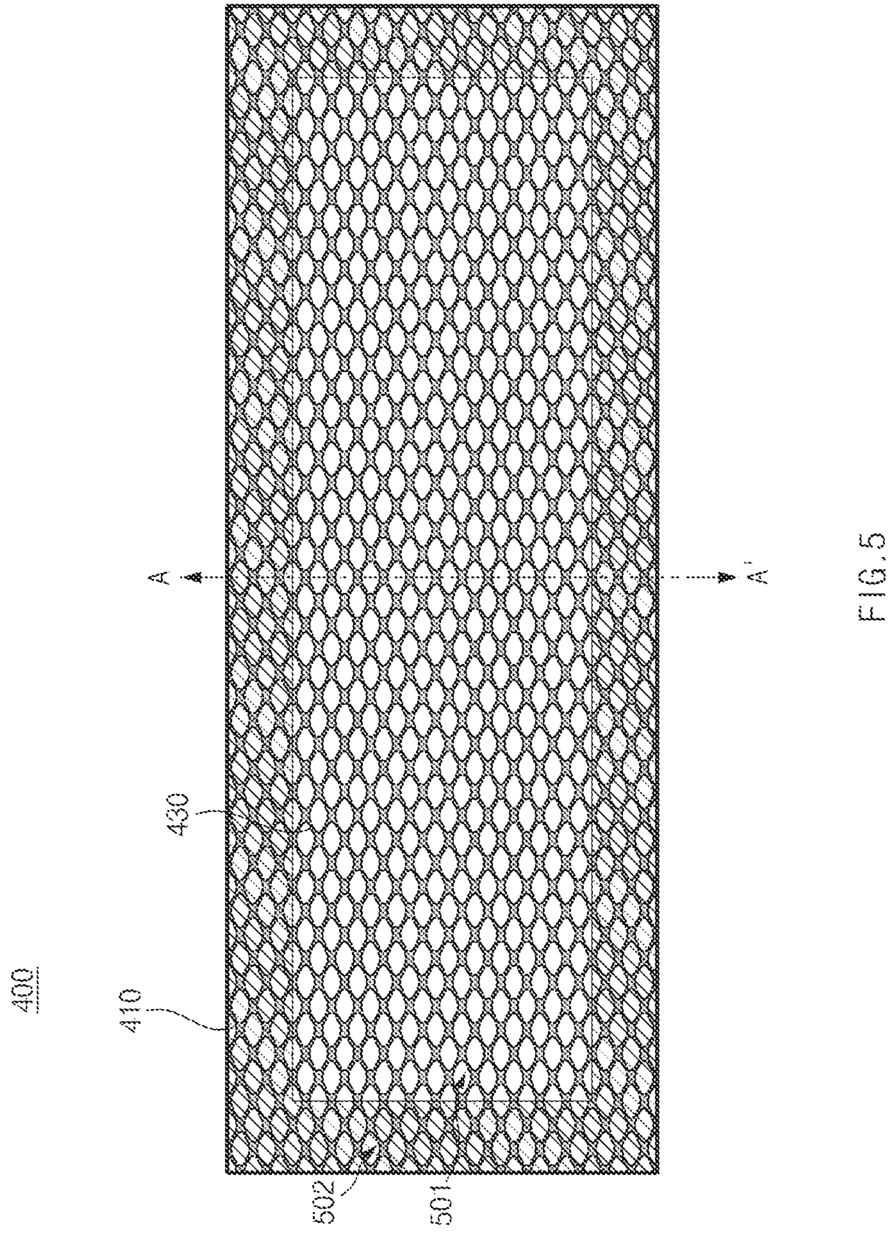
FIG. 5 is a diagram illustrating a plan view of the waterproof structure illustrated in FIG. 4 according to various embodiments.
Figure 6:
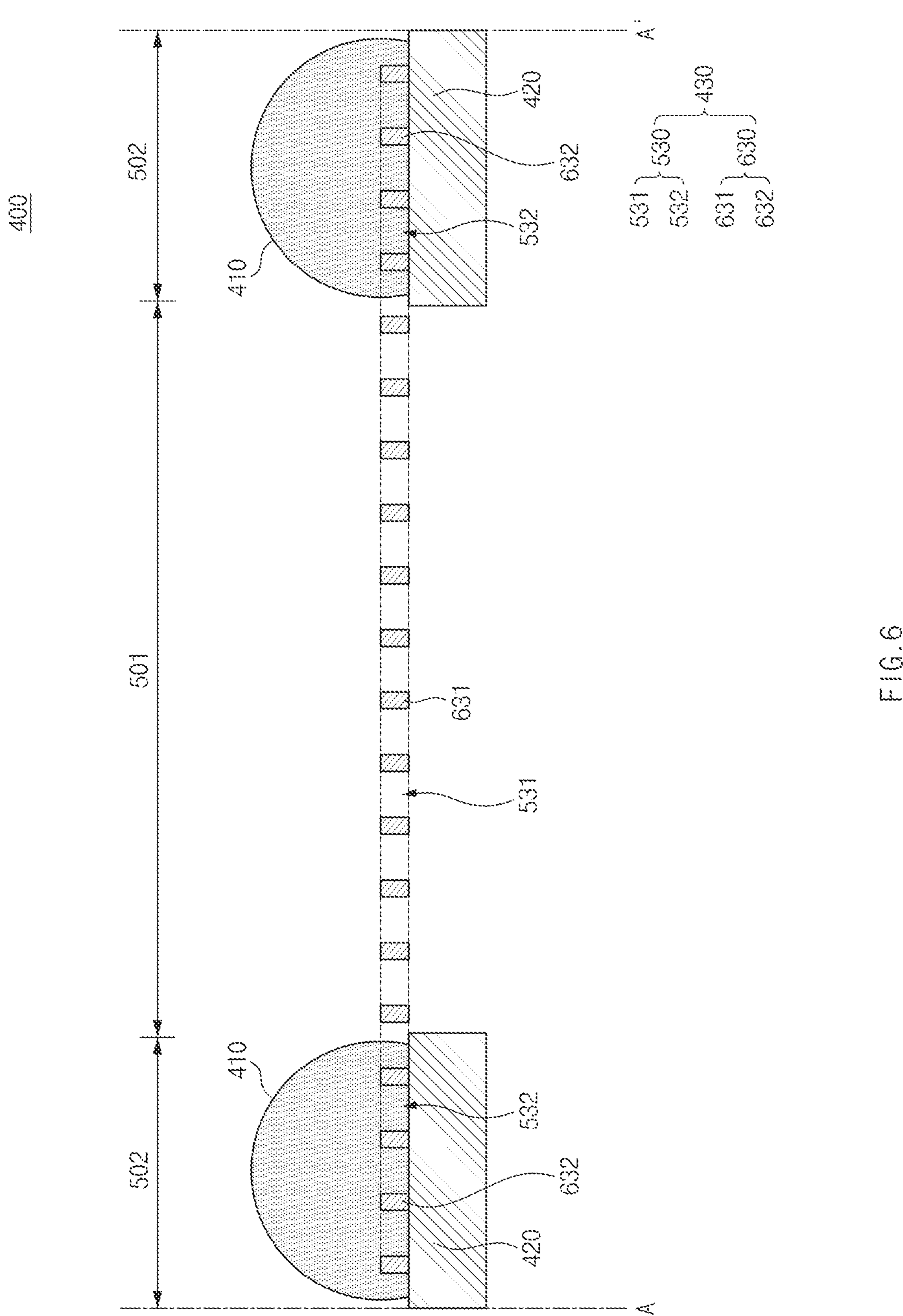
FIG. 6 is a cross-sectional view taken along line A-A' in FIG. 5 according to various embodiments.

FIG. 4 is a perspective view illustrating an example waterproof structure included in an electronic device according to various embodiments, and FIG. 5 is a diagram illustrating plan view illustrating the waterproof structure illustrated in FIG. 4 according to various embodiments. FIG. 6 is a cross-sectional view taken along line A-A' in FIG. 5 according to various embodiments.

Referring to FIGS. 4, 5 and 6, the waterproof structure 400 according to various embodiments may include a waterproof bond member 410, a waterproof tape member 420, and a porous member 430. When the waterproof structure 400 is viewed from a top, the waterproof structure 400 may include a central area 501, and a peripheral area 502 around the central area 501.

At least any one of the waterproof bond member 410 and the waterproof tape member 420 may have a frame shape. For example, the waterproof bond member 410 and the waterproof tape member 420 may have an external appearance that is similar to that of the porous member 430, and a central portion thereof may have a hollow closed curve shape.

The porous member 430 may be formed such that the sound signal generated by the speaker module (e.g., the speaker module 300 of FIG. 3) may pass therethrough but it is difficult for foreign substances, such as liquid or dust to pass therethrough. For example, the porous member 430 may be formed of at least any one of meshes and nonwoven fabric.

According to an embodiment, the porous member 430 may be disposed between the waterproof bond member 410 and the waterproof tape member 420 in the peripheral area 502. The porous member 430 may overlap the waterproof bond member 410 and the waterproof tape member 420 in the peripheral area 502.

According to an embodiment, the porous member 430 may include a plurality of openings 530 and a plurality of mesh layers 630 that surround the plurality of openings 530, respectively. A spacing distance between the mesh layers 630 may be formed to be larger than a spacing distance between the plurality of openings 530.

The mesh layers 630 may include a first mesh layer 631, and a second mesh layer 632 that is integrally formed with the first mesh layer 631. For example, the first mesh layer 631 and the second mesh layer 632 may be disposed in different areas on the same plane. The first mesh layer 631 may be disposed in the central area 501. The second mesh layer 632 may be disposed in the peripheral area 502. A width of at least any one of the first mesh layer 631 and the second mesh layer 632 may be smaller than a width and a length of at least any one of the plurality of openings 530. In an embodiment, the plurality of mesh layers 630 may be disposed on different planes to overlap each other.

According to an embodiment, the first mesh layer 631 disposed in the central area 501 may be formed to have the same width as that of the second mesh layer 632 disposed in the peripheral area 502. According to an embodiment, the first mesh layer 631 disposed in the central area 501 may be formed to have a width that is different from that of the second mesh layer 632 disposed in the peripheral area 502. For example, the width of the first mesh layer 631 may be formed to be larger than the width of the second mesh layer 632. According to an embodiment, the first mesh layer 631 may have a constant width in the central area 501, and the width of the second mesh layer 632 may be formed to be gradually smaller as it becomes more distant from the central area 501. A maximum width of the second mesh layer 632 may be similar to or the same as that of the first mesh layer 631.

According to an embodiment, a side surface of at least any one of the first mesh layer 631 and the second mesh layer 632 may be formed to be substantially perpendicular to the waterproof tape member 420. A line width of an upper surface of at least any one of the first mesh layer 631 and the second mesh layer 632, which meets a side surface of at least any one of the first mesh layer 631 and the second mesh layer 632 substantially perpendicularly and a width of a lower surface that faces the upper surface may be formed to be constant. The line width of at least any one of the first mesh layer 631 and the second mesh layer 632 may be formed to be constant. According to an embodiment, a side surface of at least any one of the first mesh layer 631 and the second mesh layer 632 may have a rectangular taper shape. A line width of at least any one of the first mesh layer 631 and the second mesh layer 632 may become gradually smaller as it becomes more distant from the waterproof tape member 420.

The plurality of openings 530 may include a plurality of first openings 531 that are disposed in the central area 501, and a plurality of second openings 532 that are disposed in the peripheral area 502. The plurality of first openings 531 may be connected to the speaker hole (e.g., the speaker hole 107 of FIGS. 1 and 2). When the waterproof structure 400 is viewed from a top, the first openings 531 and the second openings 532 may have various shapes, such as a polygonal shape, a circular shape, or an elliptical shape. The first openings 531 and the second openings 532 may have the same shape or different shapes.

According to an embodiment, the plurality of openings 530 may have the same size. For example, the plurality of openings 530 may have the same size in the central area 501 and the peripheral area 502. According to an embodiment, the plurality of openings 530 may have different sizes in the central area 501 and the peripheral area 502. For example, sizes of the plurality of openings 530 may be formed to be larger in the peripheral area 502 than in the central area 501. According to an embodiment, the plurality of first openings 531 have the same size in the central area, and the sizes of the plurality of second openings 532 may become gradually larger as they become more distant from the central area 501, in the peripheral area 502.

According to an embodiment, the waterproof bond member 410 and the waterproof tape member 420 may have different thicknesses. The waterproof bond member 410 may be formed to be thicker than the waterproof tape member 420. The waterproof bond member 410 may have an elastic force and a restoring force that are higher than those of the waterproof tape member 420.

According to an embodiment, the waterproof bond member 410 and the waterproof tape member 420 may be formed of different materials. The waterproof tape member 420 may have a form of a double-sided tape. The waterproof bond member 410 may be formed of urethane acrylate as a main ingredient thereof. For example, the waterproof bond member 410 may have characteristics as in Table 1.

TABLE 1

| | |
|---|---|
| Scientific names | Warf 25-2 |
| Viscosity | 130,000 cPs@ 10 rpm |
| Thixotropic index | 6.1 |
| Compression recovery rate (50% overlap) | 85% |
| Hardness (shore A) | 30~36 |

The waterproof bond member 410 may be formed by applying a liquid bond having a high viscosity exceeding 110,000 cPs @ 10 rpm at least twice. Accordingly, the waterproof bond member 410 formed by dispensing a liquid bond may secure a constant height and width with no deviation whereby consistency of dispensing may be ensured. When the liquid bond is applied two or more times, the process conditions each time may be the same or different.

According to an embodiment, the waterproof bond member 410 and the waterproof tape member 420 may be formed to have different shapes. Opposite surfaces of the waterproof tape member 420 may be formed to be flat. At least one surface of the waterproof bond member 410 may have a curved shape. For example, a surface of the waterproof bond member 410, which faces an opposite direction to the direction that faces the porous member 430 may have a curved shape that is convex.

At least any one of the waterproof bond member 410 and the waterproof tape member 420 may connect the porous member 430 and an internal component of the electronic device (for example, a support structure around a speaker hole of the electronic device).

Figure 7:
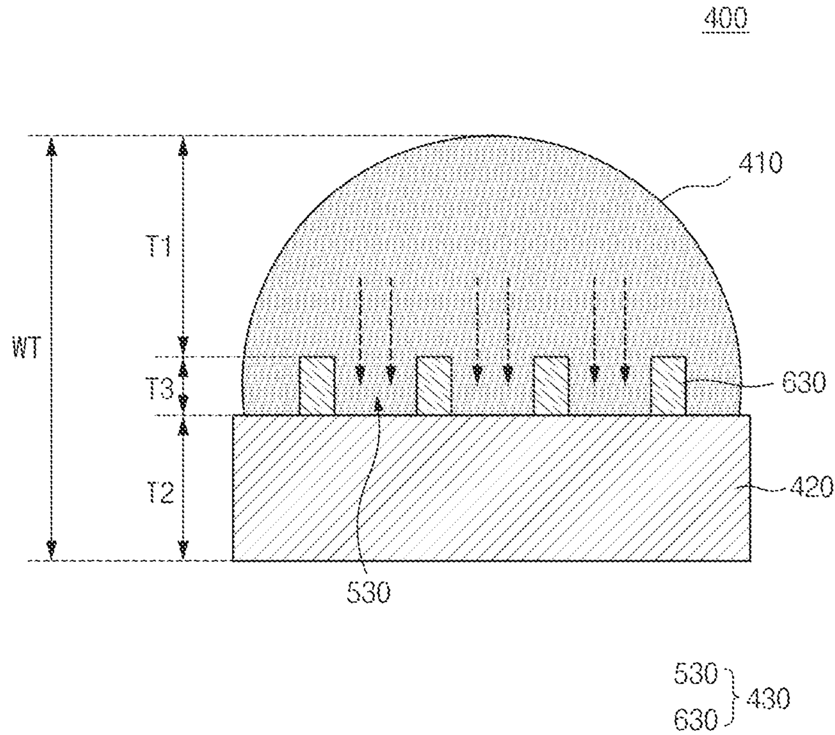
FIG. 7 is a cross-sectional view illustrating a partial area of a waterproof structure included in an electronic device according to various embodiments.

FIG. 7 is a cross-sectional view illustrating a partial area of the waterproof structure included in the electronic device according to various embodiments.

Referring to FIGS. 6 and 7, the waterproof structure 400 according to various embodiments may include the waterproof bond member 410, the waterproof tape member 420, and the porous member 430.

According to an embodiment, a surface of the waterproof bond member 410, which faces an opposite direction to the waterproof tape member 420, may have a curved surface. The curved surface of the waterproof bond member 410 may be formed to be convex toward an opposite direction to an introduction direction of the waterproof bond member 410, in which the waterproof bond member 410 is introduced between the openings 530 of the porous member 430. The waterproof bond member 410 may be coupled to the waterproof tape member 420 while the porous member 430 being interposed therebetween. A thickness T1 of the waterproof bond member 410 disposed on the mesh layer 630 may be larger than a thickness T2 of the waterproof tape member 420 and a thickness T3 of the porous member 430 including the mesh layer 630. For example, the thickness T1 of the waterproof bond member 410 disposed on the mesh layer 630 may be 0.40 mm, the thickness T2 of the waterproof tape member 420 may be 0.20 mm, and the thickness T3 of the porous member 430 including the mesh layer 630 may be 0.11 mm. The thickness T1 of the waterproof bond member 410, the thickness T2 of the waterproof tape member 420, and the thickness T3 of the porous member 430, which have been described above, are only examples and the disclosure is not limited thereto, and may be variously changed according to the specifications of the electronic device (e.g., the electronic device 101 of FIG. 3).

According to an embodiment, the waterproof bond member 410 is formed through a dispensing process, and thus a thickness thereof may be formed to be relatively small. A total thickness WT of the waterproof structure 400 including the waterproof bond member 410 may be formed to be relatively low. For example, the total thickness WT of the waterproof structure 400 according to the embodiment including the waterproof bond member 410, the waterproof tape member 420, and the porous member 430 may be formed to be lower than the total thickness of the waterproof structure of a comparative example including two bonding members, a porous member, and an elastic member of rubber. The thickness of the waterproof bond member 410 included in the waterproof structure 400 of the embodiment may be smaller than that of the elastic member of rubber included in the waterproof structure of the comparative example. Accordingly, space restrictions due to the waterproof bond member 410 according to the embodiment may be reduced, and thus, a mounting space of the waterproof structure 400 may be optimized.

Since the waterproof bond member 410 included in the waterproof structure 400 according to an embodiment has adhesive properties, at least one adhesive member may be omitted compared to the comparative example. Furthermore, costs of the waterproof bond member 410 according to an embodiment may be lower than those of the elastic member of a rubber material according to the comparative example. Accordingly, the material costs and process costs of the waterproof structure 400 according to an embodiment is reduced, and thus, manufacturing costs may be reduced.

According to an embodiment, the waterproof structure 400 may include up to three stacked parts (the waterproof bond member 410, the waterproof tape member 420, and the porous member 430). The total thickness of the waterproof structure 400 may become relatively thin, and the amount of overlap between the maximum of three parts is small, and thus, shear stresses between the three parts may be reduced. For example, a shear stress of 9.02 MPa is generated in the waterproof structure of the comparative example having an elastic member of rubber, whereas a shear stress of 5.98 MPa, which is lower than that of the comparative example may be generated in the waterproof structure 400 of the embodiment having the waterproof bond member 410, the waterproof tape member 420, and the porous member 430. In addition, the shear stress of the waterproof structure 400 of the embodiment may be lowered, and thus, a possibility of a slit occurring in at least one of the waterproof bond member 410, waterproof tape member 420, and porous member 430 may be lowered. In addition, the waterproof bond member 410, the waterproof tape member 420, and the porous member 430 may be formed into a waterproof structure in a form of a single module due to the waterproof bond member 410. Accordingly, because a bonding force between the waterproof bond member 410, the waterproof tape member 420, and the porous member 430 is excellent, a force that resists to the shear stresses may be provided more.

According to an embodiment, the waterproof bond member 410 may be coated on the waterproof tape member 420 and the porous member 430 through a dispensing process. The waterproof bond member 410 may be coated on the mesh layers 630, and may be introduced into the openings 530 between the mesh layers 630 to be coated on the waterproof tape member 420. A partial area of the waterproof bond member 410 may be coupled to the waterproof tape member 420 while the mesh layer 630 being interposed therebetween, and the remaining areas of the waterproof bond member 410 may be directly coupled to the waterproof tape member 420. Accordingly, the waterproof bond member 410, the waterproof tape member 420, and the porous member 430 may be formed in a waterproof structure that is a single module form due to the waterproof bond member 410.

Figure 8:
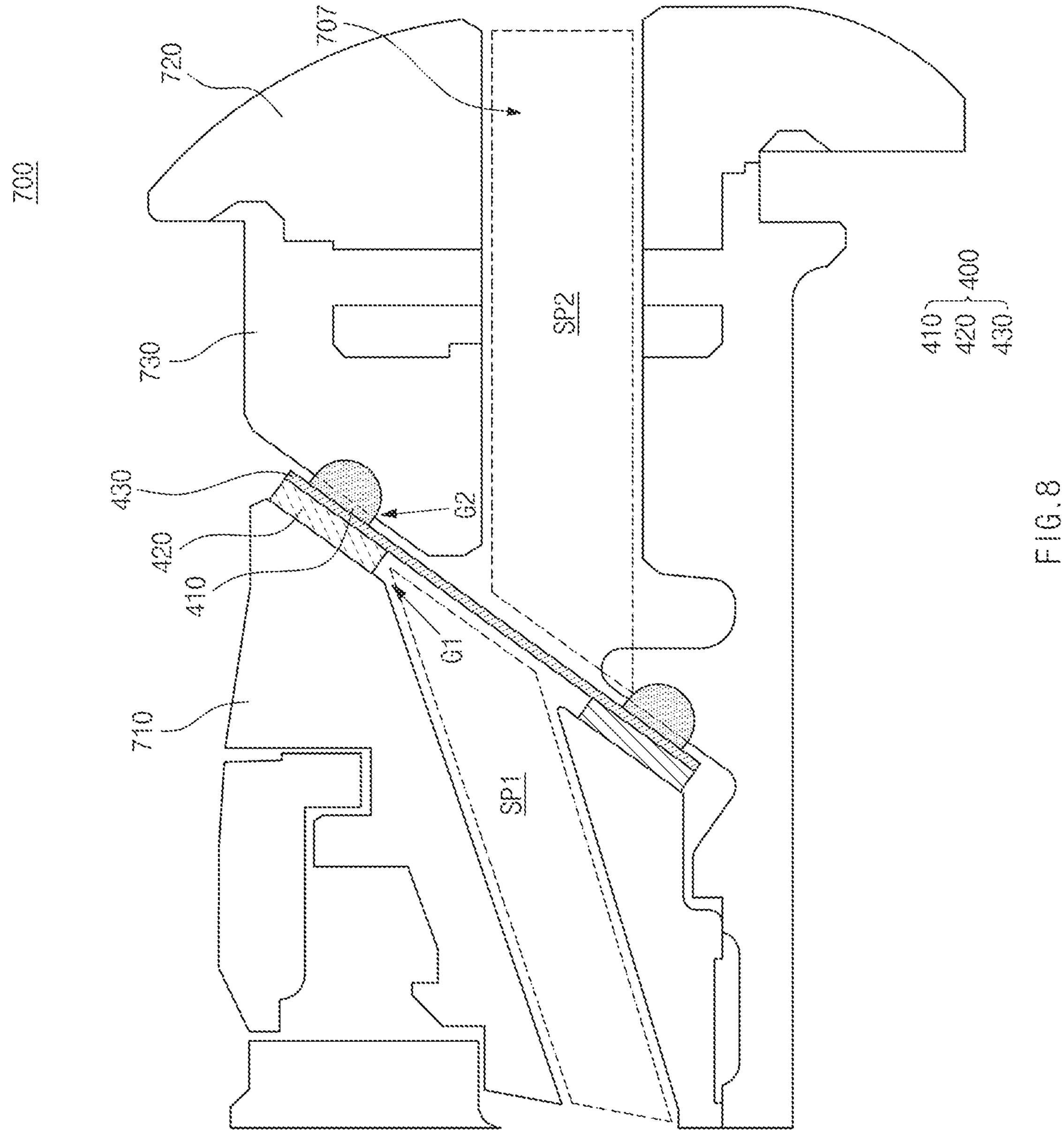
FIG. 8 is a cross-sectional view illustrating a portion of an electronic device according to various embodiments.

FIG. 8 is a cross-sectional view illustrating a portion of the electronic device according to various embodiments.

Referring to FIG. 8, an electronic device 700 according to various embodiments may discharge a sound signal discharged from the speaker module (e.g., the speaker module 300 of FIG. 3) to an outside through a first space SP1 and a second space SP2.

The first space SP1 may be provided by a module case 710 that surrounds at least a portion of the speaker module. One or more module cases 710 may be mounted in the housing (e.g., the housing 110 of FIGS. 1 and 2). The first space SP1 may be connected to an interior space of the module case 710. The second space SP2 may extend from the first space SP1 to be connected to a speaker hole 707 formed in a side member 720. The second space SP2 may be provided by at least any one of the side member 720 and a support member 730.

According to an embodiment, the first space SP1 and the second space SP2 may be connected to each other. According to an embodiment, although it is illustrated for convenience of description that the first space SP1 and the second space SP2 are divided for areas in an interior of the electronic device 700, each of the spaces may include one sound path or a sound panel, which is connected to the corresponding one.

According to various embodiments, the electronic device 700 may include the waterproof structure 400 that is disposed to spatially separate a border area between the first space SP1 and the second space SP2. According to an embodiment, the waterproof structure 400 may be disposed to be attached to at least any one of the side member 720 and the support member 730, and the module case 710, between the first space SP1 and the second space SP2. For example, the waterproof tape member 420 of the waterproof structure 400 may be attached to the module case 710, and the waterproof bond member 410 may be attached to the side member 720 or the support member 730. At least a portion of the waterproof bond member 410 having a curved shape may be pressed by the side member 720 or the support member 730. As another example, the waterproof bond member 410 may be attached to the module case 710, and the waterproof tape member 420 may be attached to the side member 720 or the support member 730. At least a portion of the waterproof bond member 410 having a curved shape may be pressed by the module case 710.

According to an embodiment, the waterproof structure 400 may prevent and/or reduce moisture or foreign substances introduced through the speaker hole 707 from being introduced into the interior of the electronic device 700. According to an embodiment, the waterproof structure 400 may include the porous member 430, such as at least one of meshes, nonwoven fabric, or a membrane. According to an embodiment, the waterproof structure 400 may block external moisture, and may discharge a sound signal discharged through the first space SP1 and the second space SP2 to an outside through the speaker hole 707.

According to an embodiment, the waterproof bond member 410 and the waterproof tape member 420 directly contact each other, and thus may prevent and/or reduce a water penetration path from being formed through an interior of the waterproof structure 400. According to an embodiment, two water penetration paths including a first gap G1 between the waterproof tape member 420 and the module case 710, and a second gap G2 between the waterproof bond member 410 and the support member 730 may be formed, but no water penetration path may be formed thorough the interior of the waterproof structure 400. Accordingly, the number of the water penetration paths of the electronic device 700 according to an embodiment may be reduced to two.

According to various embodiments, the at least one speaker hole 707 may be formed to pass from an outer surface to an inner surface of the side member 720. According to an embodiment, the speaker hole 707 may be formed from the outer surface to the inner surface of the side member 720 in parallel to the front plate (e.g., the front plate 120 of FIG. 3). As an embodiment, the speaker hole 707 may be formed to be inclined to have a specific angle with the front plate. For example, the speaker hole 707 may be formed to be inclined downwards from a horizontal direction, or may be formed to be inclined upwards. Accordingly, it is advantageous to provide an easy attachment performance of the waterproof structure 400 and change a discharge direction of sound.

Figure 9:
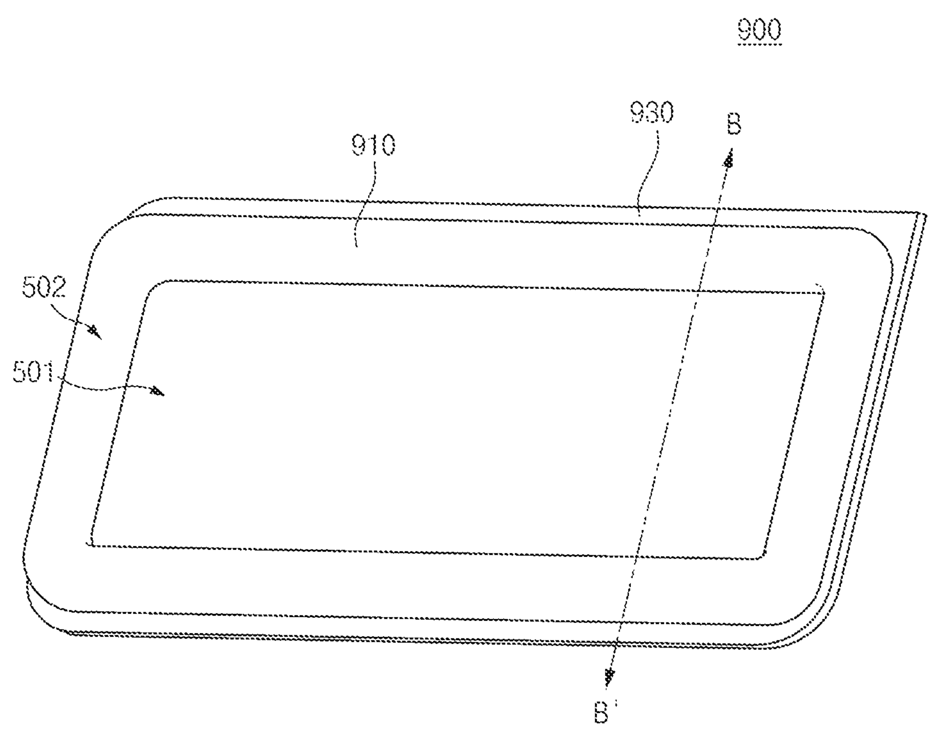
FIG. 9 is a perspective view illustrating a waterproof structure included in an electronic device according to various embodiments.
Figure 10:
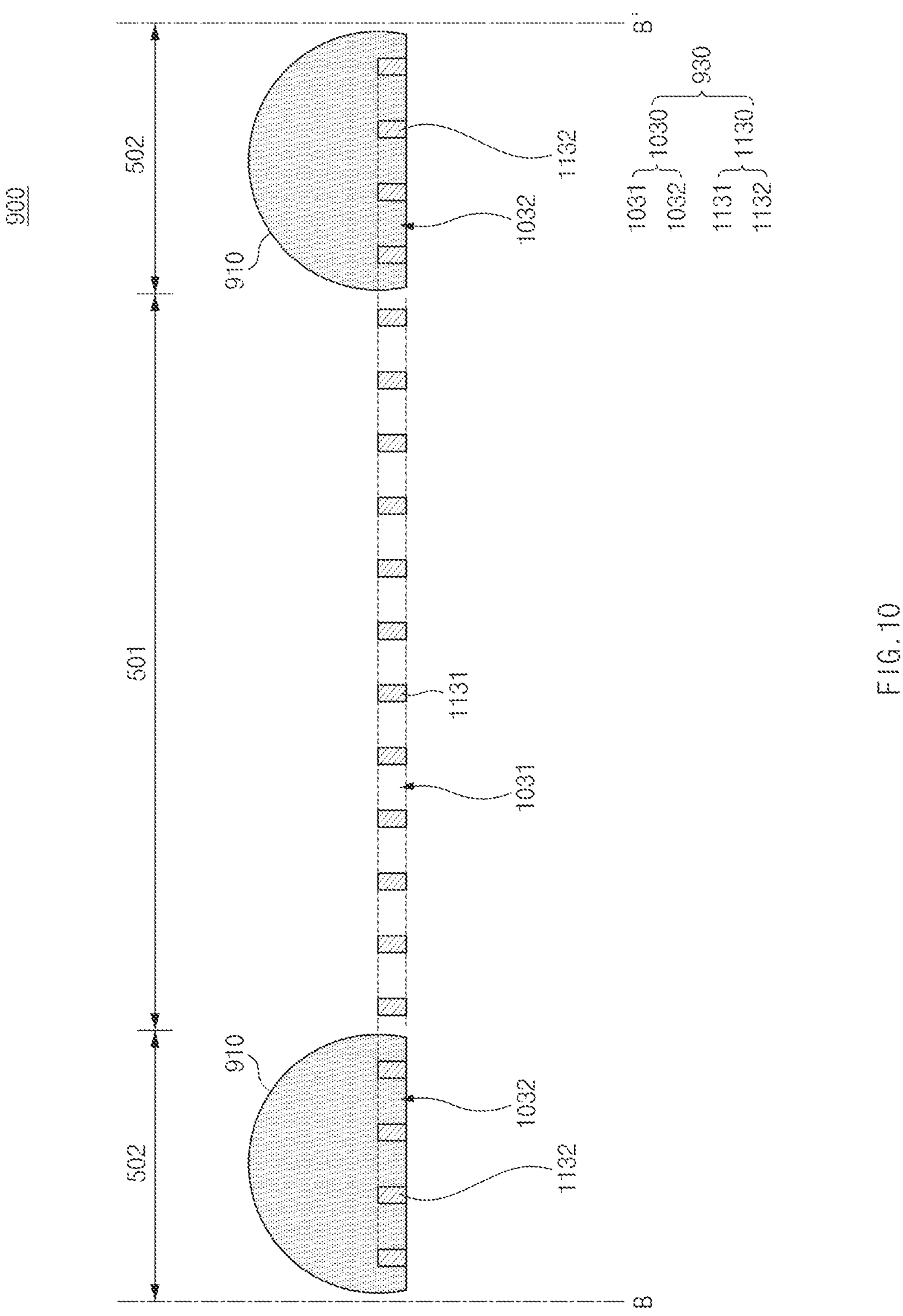
FIG. 10 is a cross-sectional view illustrating a waterproof structure taken along line B-B' in FIG. 9 according to various embodiments.
Figure 11:
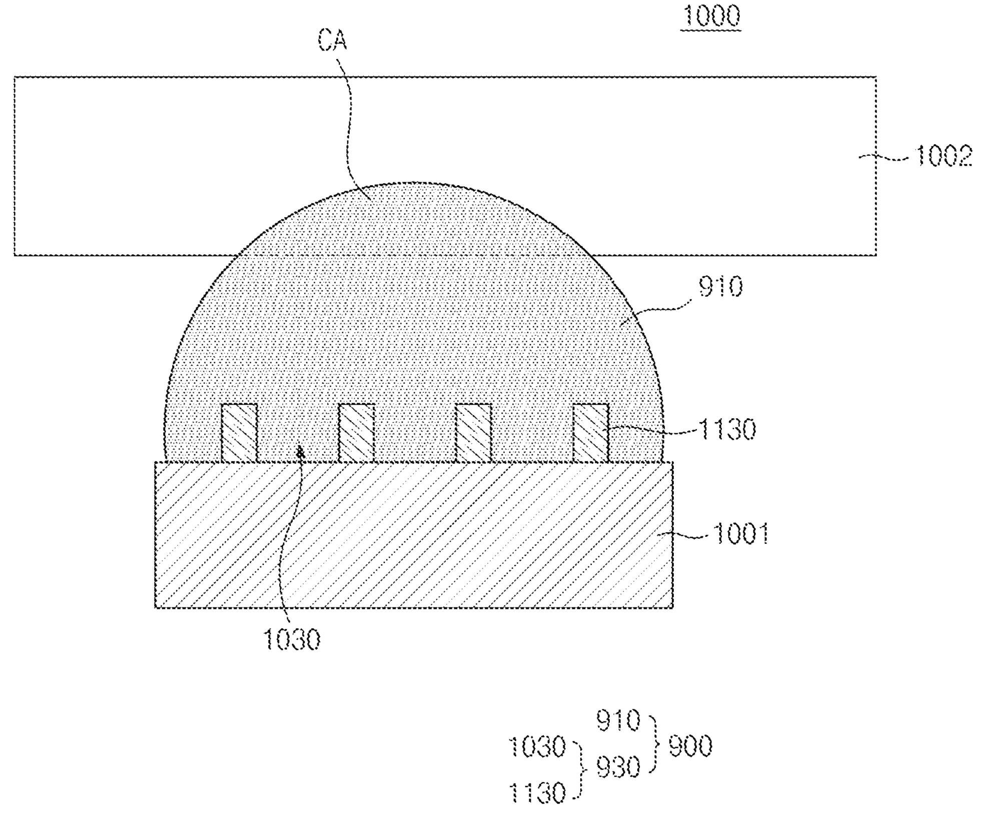
FIG. 11 is a cross-sectional view illustrating an electronic device, to which the waterproof structure illustrated in FIGS. 9 and 10 is attached according to various embodiments.

FIG. 9 is a perspective view illustrating the waterproof structure included in the electronic device according to various embodiments, FIG. 10 is a cross-sectional view illustrating the waterproof structure taken along line B-B' in FIG. 9 according to various embodiments, and FIG. 11 is a cross-sectional view illustrating the electronic device, to which the waterproof structure illustrated in FIGS. 9 and 10 is attached according to various embodiments.

Referring to FIGS. 9, 10 and 11, a waterproof structure 900 may exclude the waterproof tape member. The waterproof structure 900 may include a porous member 930 and a waterproof bond member 910. When the waterproof structure 900 is viewed from a top, the waterproof structure 900 may include the central area 501, and the peripheral area 502 around the central area 501.

The waterproof bond member 910 may be formed in a form of a frame. For example, the waterproof bond member 910 may have an external appearance that is similar to that of the porous member 930, and may have a closed curve shape, a central part of which is opened. The porous member 930 may overlap the waterproof bond member 910 in the peripheral area 502.

The porous member 930 may be formed such that the sound signal generated by the speaker module (e.g., the speaker module 300 of FIG. 3) may pass therethrough but it is difficult for foreign substances, such as liquid or dust to pass therethrough. For example, the porous member 930 may be formed of at least any one of meshes and nonwoven fabric.

According to an embodiment, the porous member 930 may include a plurality of openings 1030, and mesh layers 1130 that surround the plurality of openings 1030, respectively.

The mesh layers 1130 may include a first mesh layer 1131, and a second mesh layer 1132 that is integrally formed with the first mesh layer 1131. The first mesh layer 1131 and the second mesh layer 1132 may be disposed in different area on the same plane. The first mesh layer 1131 may be disposed in the central area 501. The second mesh layer 1132 may be disposed in the peripheral area 502. A width of at least any one of the first mesh layer 1131 and the second mesh layer 1132 may be smaller than a width and a length of at least any one of the plurality of openings 1030.

According to an embodiment, a line width of at least any one of the first mesh layer 1131 and the second mesh layer 1132 may be formed to be constant. According to an embodiment, a side surface of at least any one of the first mesh layer 1131 and the second mesh layer 1132 may have a rectangular taper shape. A line width of at least any one of the first mesh layer 1131 and the second mesh layer 1132 may become gradually larger as it goes from an upper surface to a lower surface of at least any one of the first mesh layer 1131 and the second mesh layer 1132, which contact the waterproof bond member.

According to an embodiment, the plurality of openings 1030 may include a plurality of first openings 1031 that are disposed in the central area 501, and a plurality of second openings 1032 that are disposed in the peripheral area 502. When the waterproof structure 900 is viewed from a top, at least any one of the first openings 1031 and the second openings 1032 may be formed to have various shapes, such as a polygonal shape, a circular shape, or an elliptical shape. The first openings 1031 and the second openings 1032 may have the same shape or different shapes.

According to an embodiment, the waterproof bond member 910 may be formed to be thicker than the porous member 930. The waterproof bond member 910 may have a high elastic force and restoring force.

According to an embodiment, at least one surface of the waterproof bond member 910 may be formed to have a curved shape. For example, a surface of the waterproof bond member 910, which faces an opposite direction to a direction that faces the porous member 930, may have a curved shape that is convex.

According to an embodiment, the waterproof structure 900, as illustrated in FIG. 11, may be included in an electronic device 1000, together with a first mechanical structure 1001 and a second mechanical structure 1002. At least a portion of the waterproof bond member 910 included in the waterproof structure 900 may include a pressing area CA that is pressed by the second mechanical structure 1002. The pressing area CA may protrude toward the second mechanical structure 1002. The pressing area CA may be formed in a convexly curved shape that protrudes toward the second mechanical structure 1002.

According to an embodiment, the waterproof bond member 910 may be coated on the first mechanical structure 1001 and the porous member 930 through a dispensing process. The waterproof bond member 910 may be coated on the mesh layers 1130, and may be introduced into the openings 1030 between the mesh layers 1130 to be coated on the first mechanical structure 1001. A partial area of the waterproof bond member 910 may be coupled to the first mechanical structure 1001 while the mesh layers 1130 being interposed therebetween, and the remaining areas of the waterproof bond member 910 may be directly coupled to the first mechanical structure 1001. Accordingly, the waterproof bond member 910, the first mechanical structure 1001, and the porous member 930 included in the waterproof structure 900 may be formed in a single module form due to the waterproof bond member 910.

According to an embodiment, the first mechanical structure 1001 and the second mechanical structure 1002 may face each other while the waterproof structure 900 being interposed therebetween, and any one of the first mechanical structure 1001 and the second mechanical structure 1002 may be at least any one of the module case (e.g., the module case 710 of FIG. 7), the support member (e.g., the support member 730 of FIG. 7), and the side member (e.g., the side member 720 of FIG. 7).

Figure 12A:
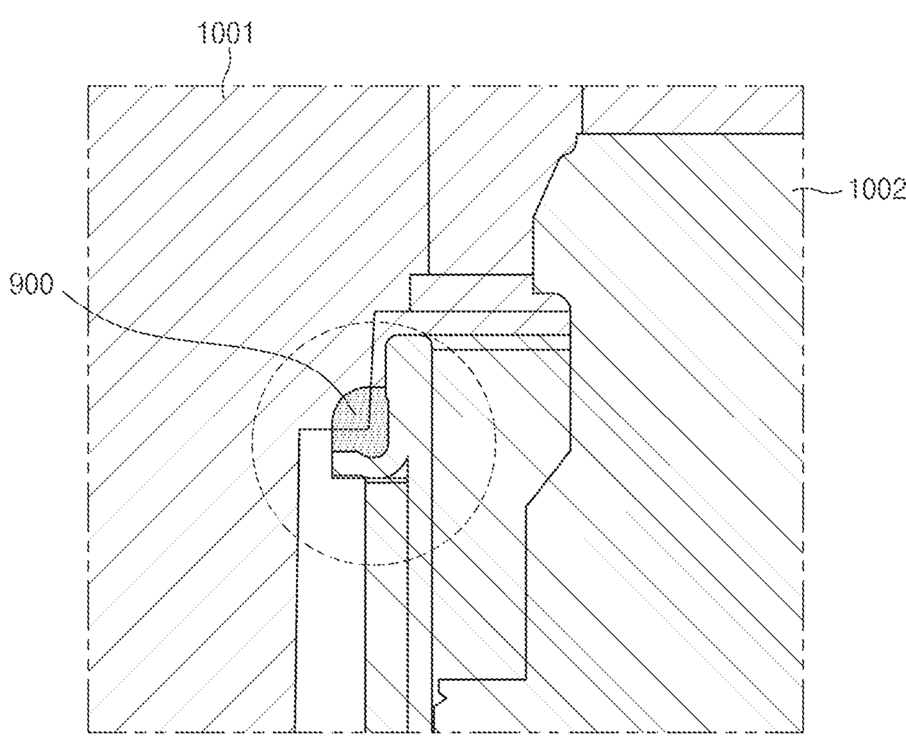
FIGS. 12A and 12B are partial sectional views illustrating various examples of an electronic device, to which a waterproof structure is applied according to various embodiments.
Figure 12B:
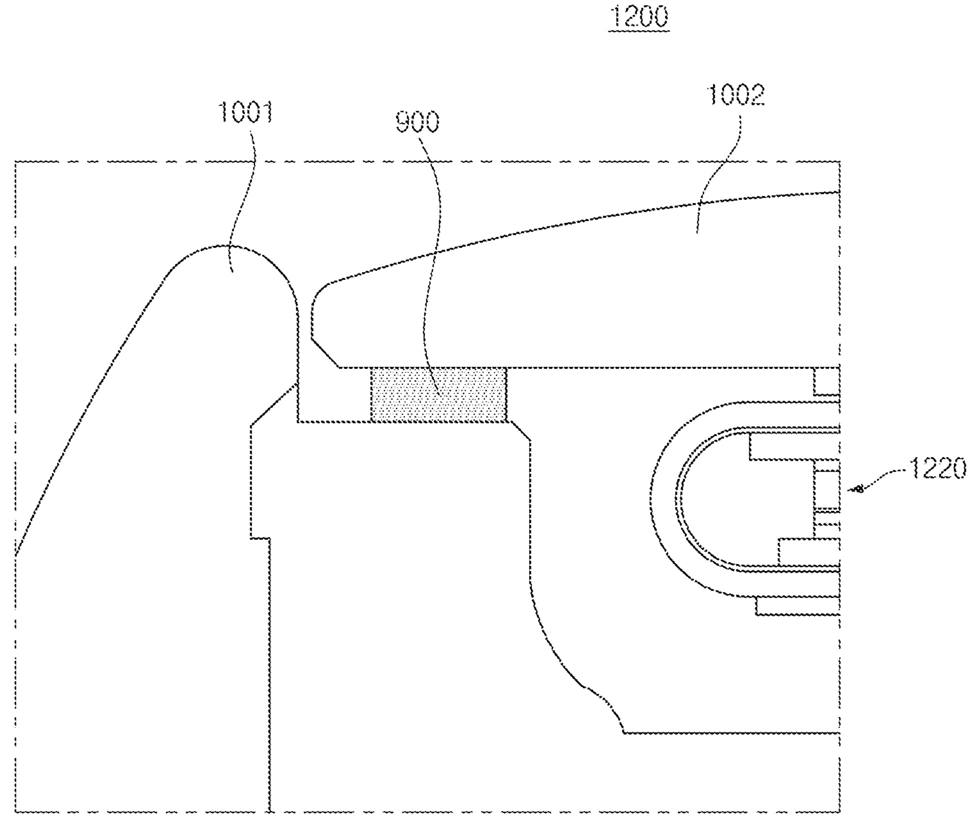
Figure 13:
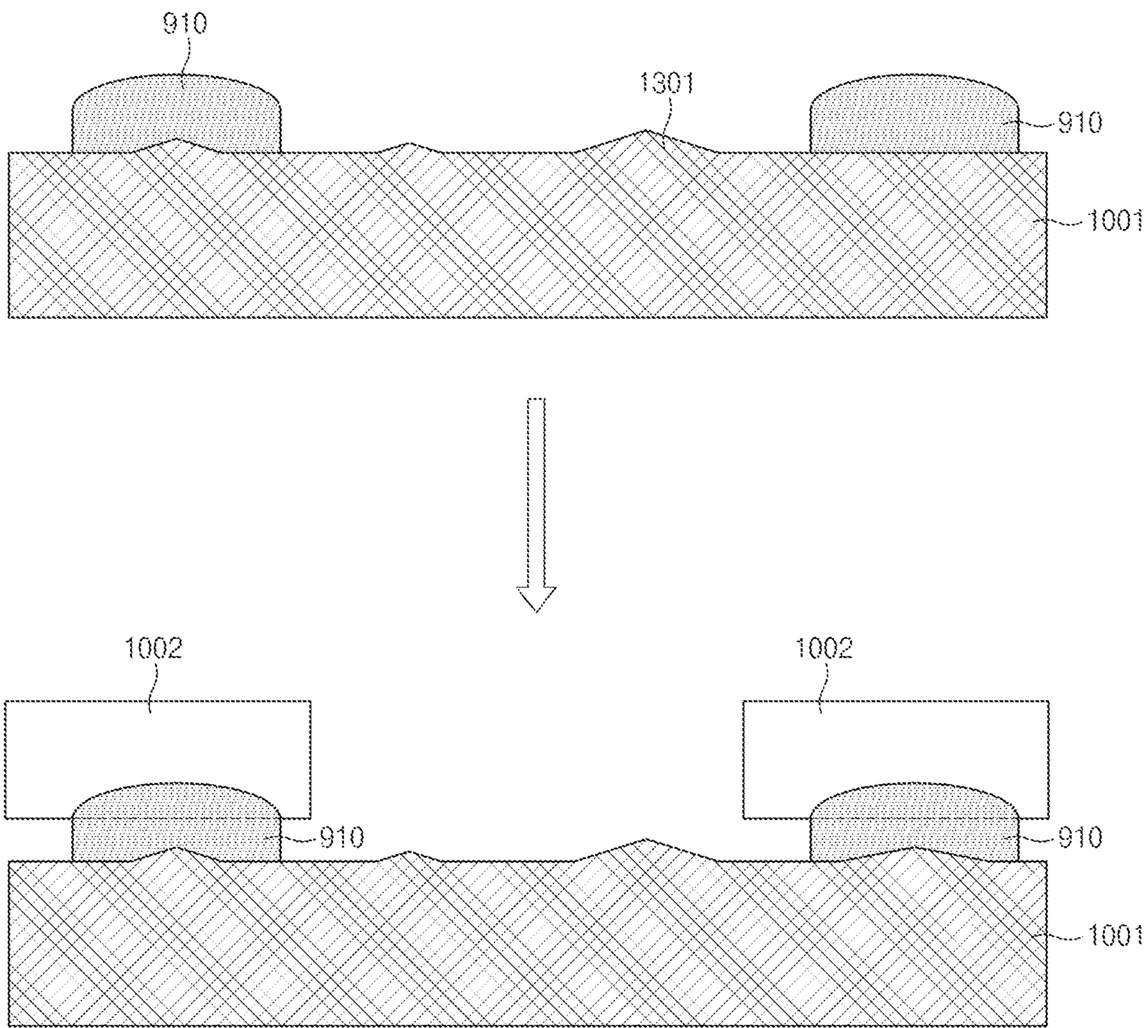
FIG. 13 is a diagram illustrating an example method for assembling the electronic device illustrated in FIGS. 12A and 12B according to various embodiments.

FIGS. 12A and 12B are partial sectional views illustrating various example of the electronic device, to which the waterproof structure is applied according to various embodiments, and FIG. 13 is a diagram illustrating an example method for assembling the electronic device illustrated in FIGS. 12A and 12B according to various embodiments. Meanwhile, FIG. 13 is a view, in which the porous member (e.g., the porous member 930 of FIG. 10) coupled to the waterproof bond member is not shown.

Referring to FIGS. 12A, 12B and 13, the first mechanical structure 1001 and the second mechanical structure 1002 may be coupled to an electronic device 1200 through the waterproof structure 900.

According to the electronic device 1200, the first mechanical structure 1001, the second mechanical structure 1002, and the porous member 930 may be coupled to each other while overlapping each other, through the waterproof bond member 910. For example, the first mechanical structure 1001, as illustrated in FIG. 12A, may be the front plate (e.g., the front plate 120 of FIG. 3), and the second mechanical structure 1002 may be a connector (e.g., a USB socket, a charging jack, or a communication jack). As another example, the first mechanical structure 1001, as illustrated in FIG. 12B, may be the side member (e.g., the side member 720 of FIG. 8) or the support member (e.g., the support member 830), and the second mechanical structure 1002 may be a window member that covers a display 1220.

At least a partial surface of at least any one of the first mechanical structure 1001 and the second mechanical structure 1002 may not be flat. For example, the first mechanical structure 1001, as illustrated in FIG. 13, may be formed to have a convexo-concave shape while a surface thereof, which contacts the waterproof bond member 910 and the porous member 930, is not flat due to a machining step. The waterproof structure 900 including the porous member and the waterproof bond member 910 may be formed on the first mechanical structure 1001 having the convexo-concave shape. Because the waterproof bond member 910 has fluidity as compared with the bonding member in a form of a tape, it also may be applied onto the uneven first mechanical structure 1001, to which it is difficult to apply the bonding member in the form of a tape. Accordingly, a succeeding process of removing the machining step may be omitted when the bonding member in the form of a tape is applied, and a waterproof performance may be ensured through the waterproof structure 900 including the waterproof bond member 910.

Figure 14:
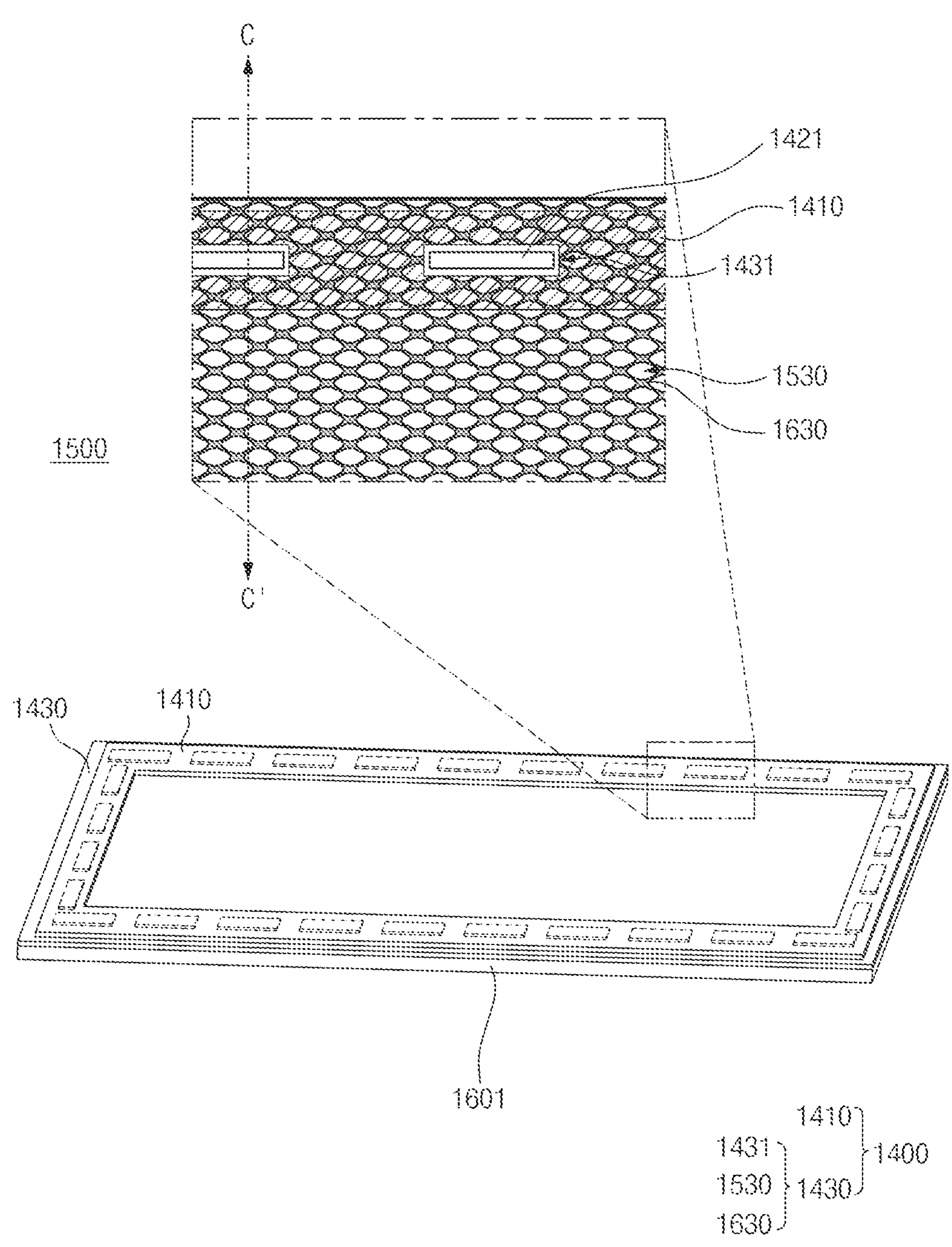
FIG. 14 is a diagram illustrating an example of a waterproof structure included in an electronic device according to various embodiments.
Figure 15:
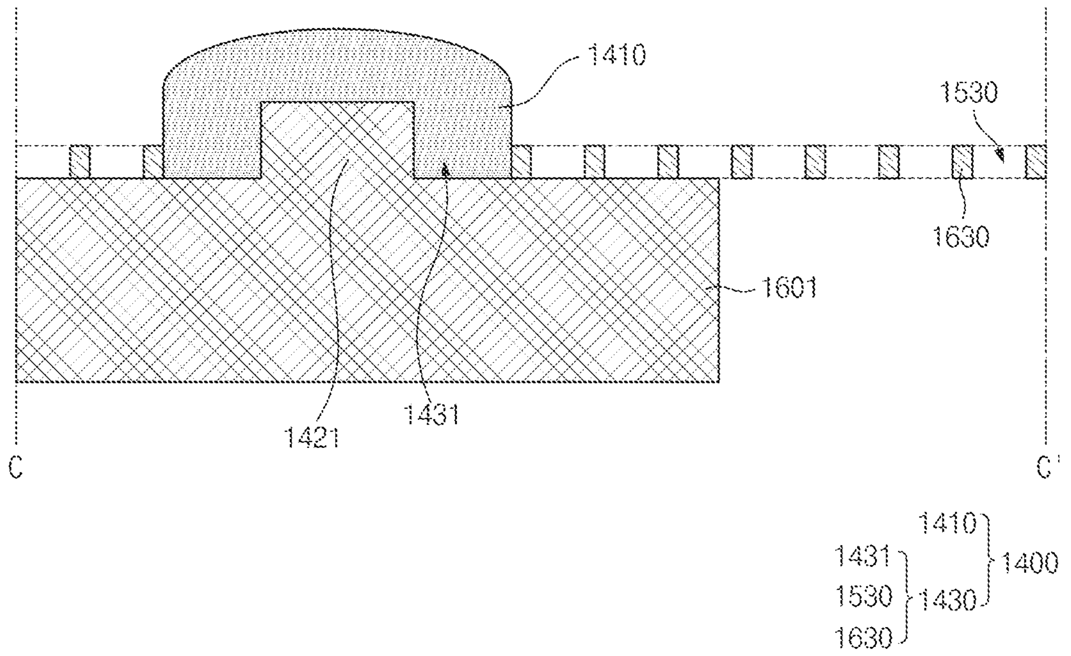
FIG. 15 is a cross-sectional view illustrating a waterproof structure taken along line C-C' in FIG. 14 according to various embodiments.
Figure 16:
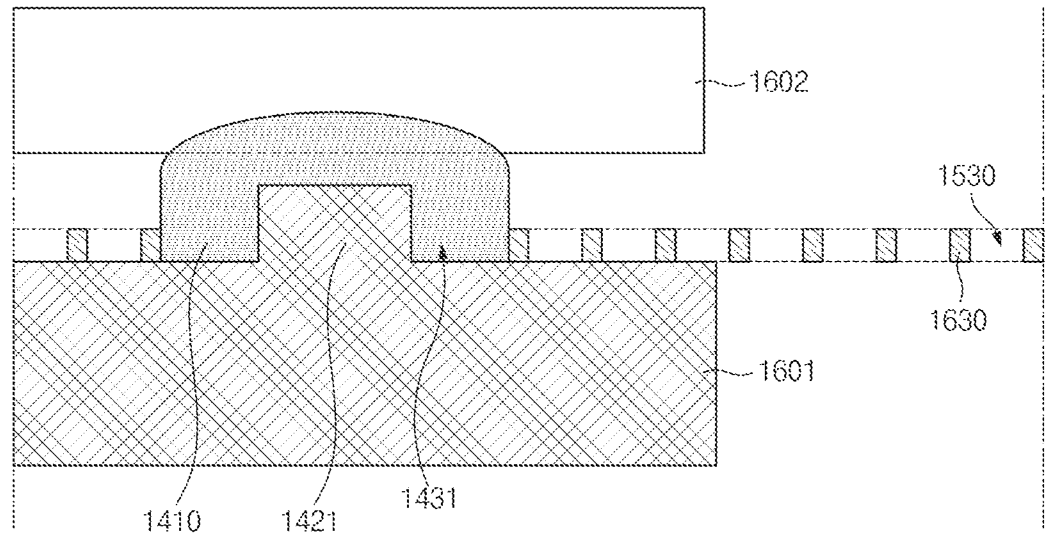
FIG. 16 is a cross-sectional view illustrating a first mechanical structure and a second mechanical structure, which are coupled to each other through the waterproof structure illustrated in FIG. 15 according to various embodiments.

FIG. 14 is a diagram illustrating an example of a waterproof structure included in an electronic device according to various embodiments, FIG. 15 is a cross-sectional view illustrating the waterproof structure taken along line C-C' in FIG. 14 according to various embodiments, and FIG. 16 is a cross-sectional view illustrating a first mechanical structure and a second mechanical structure, which are coupled to each other through the waterproof structure illustrated in FIG. 15 according to various embodiments.

An electronic device 1500 illustrated in FIGS. 14 and 15 may include a first mechanical structure 1601, and a waterproof structure 1400 that is coupled to the first mechanical structure 1601.

The first mechanical structure 1601 may be disposed in an interior of the electronic device 1500. For example, the first mechanical structure 1601 may be at least any one of the module case (e.g., the module case 710 of FIG. 7), the support member (e.g., the support member 730 of FIG. 7), the side member (e.g., the side member 720 of FIG. 7). The first mechanical structure 1601 may include at least one fixing boss 1421 that overlaps a waterproof bond member 1410. When a plurality of fixing bosses 1421 are provided, the plurality of fixing bosses 1421 may be disposed to be spaced apart from each other by a specific interval.

The waterproof structure 1400 may include a porous member 1430 and a waterproof bond member 1410. The porous member 1430 may include a plurality of openings 1530, mesh layers 1630 that surround the plurality of openings 1530, respectively, and at least one fixing recess 1431. The fixing recess 1431 may be formed to be larger than at least any one of the plurality of openings 1530. When a plurality of fixing recesses 1431 are provided, the plurality of fixing recesses 1431 may be disposed to be spaced apart from each other by a specific interval. The fixing recesses 1431 may be disposed at locations corresponding to the fixing bosses 1421.

The fixing recesses 1431 may be coupled to the fixing bosses 1421 of the first mechanical structure 1601. Sizes of the fixing recesses 1431 may be formed to be larger than sizes of the fixing bosses 1421. For example, lengths and widths of the fixing recesses 1431 may be larger than lengths and widths of the fixing bosses 1421. As another example, the widths of the fixing recesses 1431 may be larger than or equal to the widths of the fixing bosses 1421. Any one of the lengths and widths of the fixing recesses 1431 may be the same as any one of the lengths and widths of the fixing bosses 1421, and the remaining one of the lengths and widths of the fixing recesses 1431 may be larger than the remaining one of the lengths and widths of the fixing bosses 1421. Thicknesses of the fixing bosses 1421 may be larger than depths of the fixing recesses 1431.

The waterproof bond member 1410 may be coated on the mesh layers 1630, and may be introduced through the fixing recesses 1431 to be coated on the first mechanical structure 1601. A partial area of the waterproof bond member 1410 may be coupled to the first mechanical structure 1601 while the porous member 1430 being interposed therebetween, and the remaining areas of the waterproof bond member 1410 may be directly coupled to the first mechanical structure 1601.

According to an embodiment, the waterproof bond member 1410, as illustrated in FIG. 16, may be formed to have a convexly curved surface that protrudes toward the second mechanical structure 1602. At least a portion of the convexly curved surface of the waterproof bond member 1410 may be pressed by the second mechanical structure 1602.

According to various embodiments, the porous member 1430 including the fixing recesses 1431 also may be applied to the waterproof structure 400 illustrated in FIG. 4, as well as to the waterproof structure 1500 illustrated in FIG. 14. For example, the porous member 430 included in the waterproof structure 400 illustrated in FIG. 4 may include the fixing recesses 1431 that are coupled to the fixing bosses 1421 formed in the waterproof tape member 420. As another example, the porous member 430 included in the waterproof structure 400 illustrated in FIG. 4 may include the fixing recesses 1431 that are coupled to the fixing bosses 1421 formed in the mechanical structure (e.g., the support member 730 or the module case 710 of FIG. 8) disposed under the waterproof tape member.

FIGS. 17A, 17B, 17C and 17D are diagrams illustrating an example method for manufacturing an electronic device including a waterproof structure according to various embodiments.

Figure 17A:
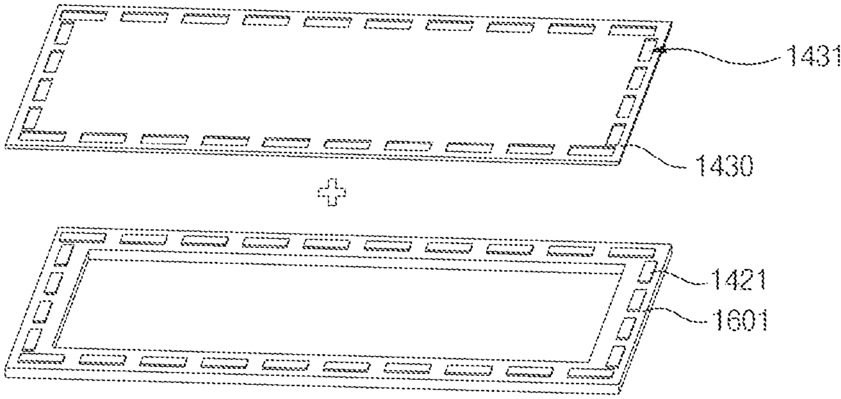
FIGS. 17A, 17B, 17C and 17D are diagrams and views illustrating an example method for manufacturing an electronic device including a waterproof structure according to various embodiments.

Referring to FIG. 17A, the porous member 1430 including at least one fixing recess 1431, and the first mechanical structure 1601 including at least one fixing boss 1421 may be provided. The fixing recess 1431 may be formed to have a size that is larger than that of at least any one of the plurality of openings included in the porous member 1430. The fixing bosses 1421 may be disposed to correspond to the fixing recesses 1431 in one-to-one relationship. Sizes of the fixing bosses 1421 may be formed to be smaller than sizes of the fixing recesses 1431.

Figure 17B:
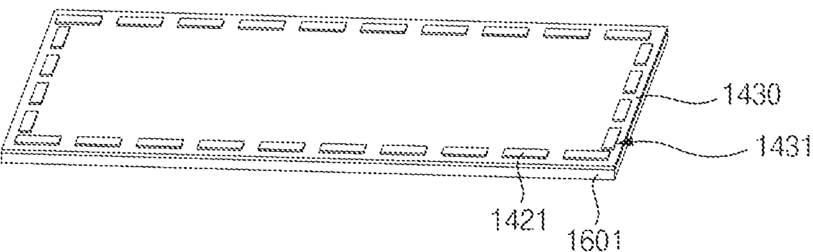

Referring to FIG. 17B, the porous member 1430 may be aligned on the first mechanical structure 1601. As the fixing bosses 1421 are inserted into the fixing recesses 1431, the porous member 1430 may be seated on the first mechanical structure 1601.

Figure 17C:
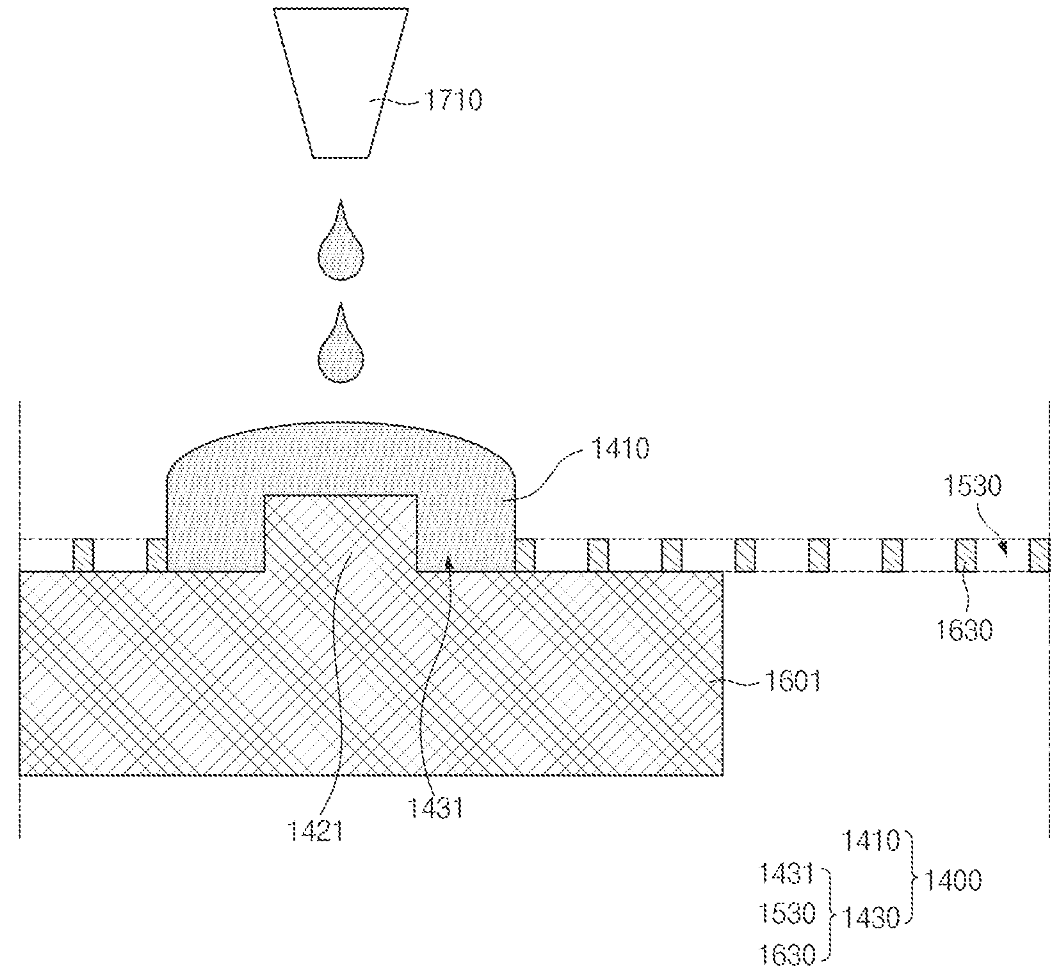

Referring to FIG. 17C, a dispenser 1710 may be aligned on the porous member 1430 seated on the first mechanical structure 1601. The dispenser 1710 may drop a liquid bond material onto the porous member 1430 while being moved along the peripheral area of the porous member 1430. As the liquid bond material is hardened after being dropped onto the first mechanical structure 1601 and the porous member 1430 through the dispenser 1710, the waterproof bond member 1410 may be formed. The waterproof bond member 1410 may be formed to surround the fixing bosses 1421. The waterproof bond member 1410 may be disposed upper surfaces and opposite side surfaces of the fixing bosses 1421. The waterproof bond member 1410 may be coated on the fixing bosses 1421, and may be introduced into the fixing recesses 1431 between the fixing bosses 1421 and the porous member 1430 to be coated on the first mechanical structure 1601. The waterproof bond member 1410 may be directly coupled to the fixing bosses 1421, and may be directly coupled to the first mechanical structure 1601.

According to an embodiment, a portion of the waterproof bond member 1410 may be coupled to the first mechanical structure 1601 through the openings 1530.

Figure 17D:
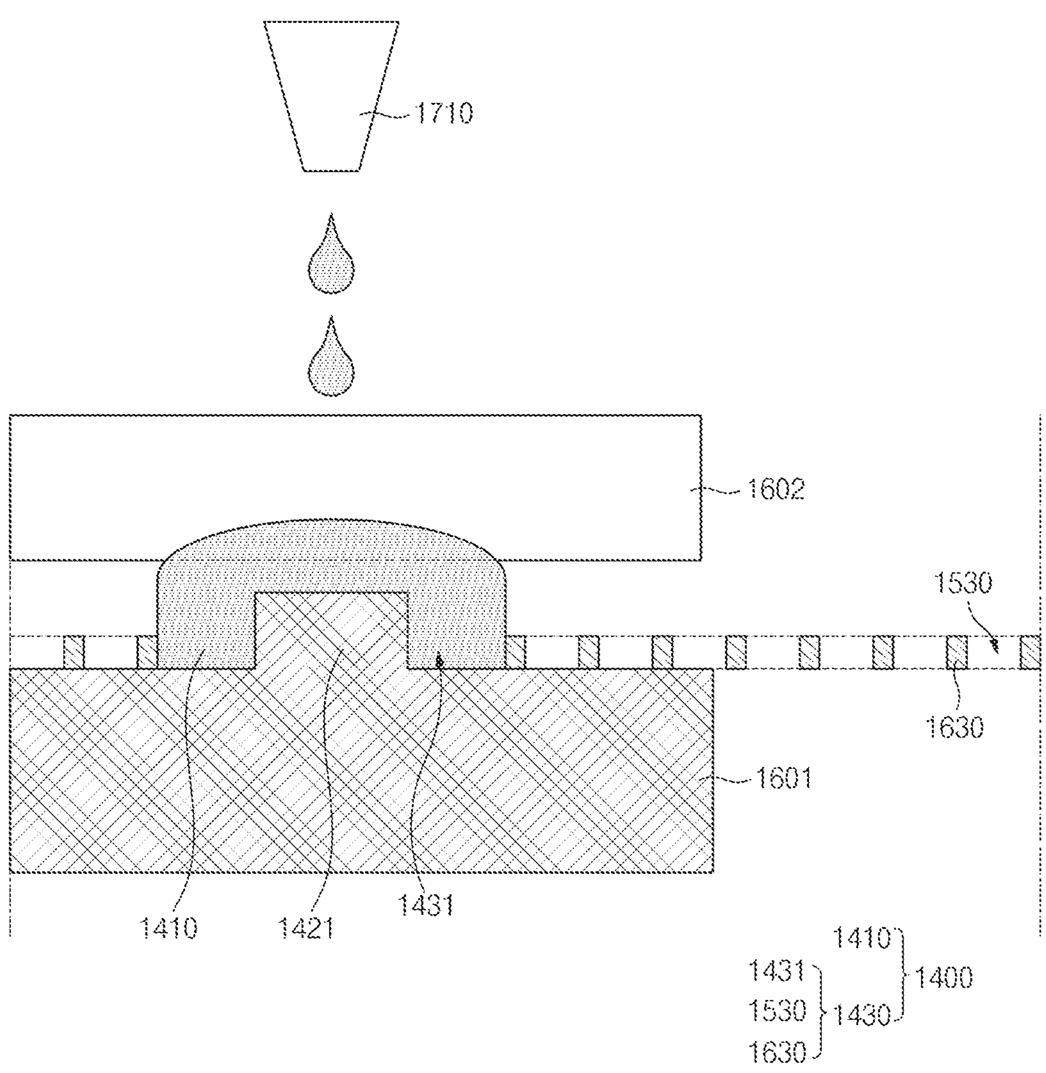

Referring to FIG. 17D, a second mechanical structure 1602 may be seated on the waterproof bond member 1410. Through the waterproof bond member 1410, the first mechanical structure 1601 and the second mechanical structure 1602 may be coupled to each other while overlapping each other.

The waterproof structure (e.g., the waterproof structure 400 of FIG. 4, the waterproof structure 900 of FIG. 9, or the waterproof structure 1400 of FIG. 14) according to various embodiments of the disclosure may be applied to a through-hole, such as a microphone hole (e.g., the microphone holes 103 and 104 of FIG. 1) or a sensor hole (e.g., the atmospheric sensor hole) as well as a speaker hole (e.g., the speaker hole 707 of FIG. 8), which connects an inside and an outside of an electronic device (e.g., the electronic device 101 of FIG. 1). The through-hole may be formed to pass from an inside to an outside of the housing (e.g., the housing 110 of FIG. 1). The waterproof structure according to various embodiments of the disclosure may be disposed in the same or similar structure on one side of at least any one of the speaker hole, the microphone hole, and the sensor hole.

According to various example embodiments of the disclosure, an electronic device may include: a side member comprising a bezel at least partially surrounding a space between a front surface and a rear surface of the electronic device, a speaker hole formed through at least a portion of the side member, a module case disposed in an interior of the space and surrounding a speaker module comprising a speaker configured to emit sound through the speaker hole, and a waterproof structure disposed between the side member and the module case, wherein the waterproof structure may include a waterproof tape, a porous member comprising a porous material having a plurality of openings, the openings having sizes smaller than a size of the speaker hole, and a waterproof bond member comprising a waterproof bonding material extending through the plurality of openings and coupled to the waterproof tape member and the porous member while overlapping with the waterproof tape member and the porous member.

According to various example embodiments of the disclosure, when the waterproof structure is viewed from above, the waterproof structure may include a central area, and a peripheral area around the central area, and the waterproof bond member and the waterproof tape member may be formed in hollow frame shapes in the central area.

According to various example embodiments of the disclosure, the porous member may be disposed between the waterproof bond member and the waterproof tape member in the peripheral area.

According to various example embodiments of the disclosure, the waterproof bond member may be thicker than at least any one of the waterproof tape member and the porous member.

According to various example embodiments of the disclosure, at least portion of at least one surface of the waterproof bond member may have a curved surface.

According to various example embodiments of the disclosure, the waterproof bond member may have a curved surface convex toward an opposite direction to an introduction direction of the waterproof bond member.

According to various example embodiments of the disclosure, the electronic device may further include the module case surrounding the speaker module, at least a portion of the waterproof bond member may be pressed while contacting any one of the module case and the side member, and the waterproof tape member may be attached to an other one of the module case and the side member.

According to various example embodiments of the disclosure, the porous member may include mesh layers surrounding the plurality of openings.

According to various example embodiments of the disclosure, line widths of the mesh layers may be smaller than widths and lengths of the openings.

According to various example embodiments of the disclosure, spacing distances between the mesh layers may be greater than spacing distances between the plurality of openings.

According to various example embodiments of the disclosure, an electronic device may include: a first mechanical structure including a surface facing an outside of the electronic device, a second mechanical structure including a surface spaced apart from the first mechanical structure, a through-hole formed through at least a portion of the first mechanical structure, and a waterproof structure disposed between the first mechanical structure and the second mechanical structure, wherein the waterproof structure may include a porous member comprising a porous material connected to the through-hole and having a plurality of openings, the openings having sizes smaller than a size of the through-hole, and a waterproof bond member comprising a waterproof bonding material extending into the plurality of openings and coupled to the first mechanical structure and the porous member while overlapping with the first mechanical structure and the porous member.

According to various example embodiments of the disclosure, when the waterproof structure is viewed from above, the waterproof structure may include a central area, and a peripheral area around the central area, and the waterproof bond member may be formed in hollow frame shapes in the central area.

According to various example embodiments of the disclosure, the porous member may be disposed between the waterproof bond member and the first mechanical structure in the peripheral area.

According to various example embodiments of the disclosure, the porous member may further include at least one fixing recess disposed in the peripheral area, having a size larger than a size of any one of the plurality of openings, and the first mechanical structure may further include at least one fixing boss coupled to the fixing recess.

According to various example embodiments of the disclosure, the waterproof bond member may be coupled to the fixing boss.

According to various example embodiments of the disclosure, the waterproof bond member may have a curved surface convex toward the second mechanical structure.

According to various example embodiments of the disclosure, the porous member may include mesh layers surrounding the plurality of openings, respectively, and the porous member may include a mesh structure or nonwoven fabric.

According to various example embodiments of the disclosure, spacing distances between the mesh layers may be greater than spacing distances between the plurality of openings.

According to various example embodiments of the disclosure, the first mechanical structure may include a side member comprising a bezel at least partially surrounding a space between a front surface and a rear surface of the electronic device, and the second mechanical structure may include a module case surrounding a speaker module disposed in an interior of the side member.

According to various example embodiments of the disclosure, the electronic device may further include a side member comprising a bezel at least partially surrounding a space between a front surface and a rear surface of the electronic device, and the through-hole may be at least any one of a speaker hole, a microphone hole, and a sensor hole extending through at least a portion of the side member.

The various embodiments of the disclosure and the terms used herein do not limit the technology described in the disclosure to specific forms, and should be construed to include various modifications, equivalents, and/or replacements of the embodiments. With regard to description of drawings, similar components may be marked by similar reference numerals. In the disclosure disclosed herein, the expressions “A or B”, or “at least one of A or/and B”, “A, B, or C”, or “at least one of A, B, or/and C”, and the like used herein may include any and all combinations of one or more of the associated listed items. The terms, such as “first”, “second”, and the like used herein may refer to various elements of various embodiments of the disclosure, but do not limit the elements. For example, such terms are used only to distinguish an element from another element and do not limit the order and/or priority of the elements. If it is mentioned that an element (e.g., a first element) is (functionally or communicatively) “connected” to another element (e.g., a second element), the first element may be directly connected to the second element or may be connected to the second element through another element (e.g., a third element).

In the disclosure, the expression “configured to” may be interchangeably used with, for example, “suitable for”, “capable of”, “modified to”, “made to”, “able to”, or “designed to” according to a situation in a hardware or software way. In some situations, the expression “a device configured to” may refer, for example to the device being “capable of” operating together with another device or other components. CPU, for example, a “processor configured to (or set to) perform A, B, and C” may refer, for example, to a dedicated processor (e.g., an embedded processor) for performing a corresponding operation or a generic-purpose processor (e.g., a central processing unit (CPU) or an application processor) which may perform corresponding operations by executing one or more programs which are stored in a memory device.

The term “module” used in the disclosure may include a unit configured in a hardware, software, or firmware way, or any combination thereof, and for example, may be used interchangeably with the terms such as logic, a logic block, a component, or a circuit. The “module” may be an integral component, or a minimum unit or a part which performs one or more functions. The “module” may be implemented mechanically or electronically, and for example, may include an application-specific integrated circuit (ASIC) chip, field-programmable gate arrays (FPGAs), or a programmable logic device that is known or to be developed in the future, which performs some operations.

At least some of the devices (e.g., modules or functions) or methods (e.g., operations) according to various embodiments of the disclosure may be implemented by an instruction stored in a computer-readable storage medium (e.g., the memory 730), for example, in the form of a program module. When the instruction is executed by the processor (for example, the processor), the at least one processor may perform a function corresponding to the instruction. The computer-readable recording medium may include a hard disk, a floppy disk, a magnetic medium (e.g., a magnetic tape), an optical recording medium (e.g., a compact disc read only memory (CD-ROM) or a digital versatile disc (DVD)), a magneto-optical medium (e.g., a floptical disk), and an embedded memory. The instruction may include a code made by a compiler or a code that may be executed by an interpreter.

According to various embodiments, each component (e.g., a module or a program) of the above-described components may include a single entity or multiple entities and some of multiple entities may be separately disposed on the other components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing comprising a first surface, a second surface, and a side member comprising a bezel at least partially surrounding a space between the first surface and the second surface;

a speaker hole extending through at least a portion of the side member;

a module case disposed in an interior of the space and surrounding a speaker module comprising a speaker configured to emit sound through the speaker hole; and a waterproof structure disposed between the side member and the module case, wherein the waterproof structure includes:

a waterproof tape member comprising a waterproof tape;

a porous member comprising a porous material having a plurality of openings, the openings having sizes smaller than a size of the speaker hole; and a waterproof bond member comprising a waterproof bonding material extending through the plurality of openings and coupled to the waterproof tape member and the porous member while overlapping with the waterproof tape member and the porous member.

2. The electronic device of claim 1, wherein the waterproof structure includes a central area, and a peripheral area around the central area, and wherein the waterproof bond member and the waterproof tape member are disposed in hollow frame shapes in the central area.

3. The electronic device of claim 2, wherein the porous member is disposed between the waterproof bond member and the waterproof tape member in the peripheral area.

4. The electronic device of claim 1, wherein the waterproof bond member is thicker than at least any one of the waterproof tape member or the porous member.

5. The electronic device of claim 1, wherein at least portion of at least one surface of the waterproof bond member is a curved.

6. The electronic device of claim 5, wherein the waterproof bond member has a curved surface convex toward an opposite direction to an introduction direction of the waterproof bond member.

7. The electronic device of claim 1, wherein at least a portion of the waterproof bond member is pressed while contacting any one of the module case or the side member, and wherein the waterproof tape member is attached to another one of the module case or the side member.

8. The electronic device of claim 1, wherein the porous member includes mesh layers surrounding the plurality of openings, and wherein the porous member includes at least any one of meshes or nonwoven fabric.

9. The electronic device of claim 8, wherein line widths of the mesh layers are smaller than widths and lengths of the openings.

10. The electronic device of claim 8, wherein spacing distances between the mesh layers are greater than spacing distances between the plurality of openings.

11. An electronic device comprising:

a first mechanical structure comprising a surface facing an outside of the electronic device;

a second mechanical structure comprising a surface spaced apart from the first mechanical structure;

a through-hole extending through at least a portion of the first mechanical structure; and a waterproof structure disposed between the first mechanical structure and the second mechanical structure, wherein the waterproof structure includes:

a porous member comprising a porous material connected to the through-hole and having a plurality of openings, the openings having sizes smaller than a size of the through-hole; and a waterproof bond member comprising a waterproof bonding material extending into the plurality of openings and coupled to the first mechanical structure and the porous member while overlapping with the first mechanical structure and the porous member.

12. The electronic device of claim 11, wherein when the waterproof structure is viewed from above, the waterproof structure includes a central area, and a peripheral area around the central area, and wherein the waterproof bond member is formed in hollow frame shapes in the central area.

13. The electronic device of claim 12, wherein the porous member is disposed between the waterproof bond member and the first mechanical structure in the peripheral area.

14. The electronic device of claim 12, wherein the porous member further includes:

at least one fixing recess disposed in the peripheral area, having a size greater than a size of any one of the plurality of openings, wherein the first mechanical structure further includes:

at least one fixing boss coupled to the fixing recess.

15. The electronic device of claim 14, wherein the waterproof bond member is coupled to the fixing boss.

16. The electronic device of claim 15, wherein the waterproof bond member has a curved surface convex toward the second mechanical structure.

17. The electronic device of claim 11, wherein the porous member includes mesh layers surrounding the plurality of openings, and wherein the porous member includes at least any one of meshes and nonwoven fabric.

18. The electronic device of claim 17, wherein spacing distances between the mesh layers are greater than spacing distances between the plurality of openings.

19. The electronic device of claim 11, wherein the first mechanical structure includes a side member comprising a bezel at least partially surrounding a space between a front surface and a rear surface of the electronic device, and wherein the second mechanical structure includes a module case surrounding a speaker module disposed in an interior of the side member.

20. The electronic device of claim 11, further comprising:

a side member comprising a bezel at least partially surrounding a space between a front surface and a rear surface of the electronic device, wherein the through-hole includes at least any one of a speaker hole, a microphone hole, and a sensor hole formed through at least a portion of the side member.

* * * * *